United States Patent [19]
Griffith et al.

[11] Patent Number: 5,633,736
[45] Date of Patent: May 27, 1997

[54] SCAN LENS AND AN OPTICAL SCANNER SYSTEM INCORPORATING TWO DEFLECTORS

[75] Inventors: John D. Griffith; C. Benjamin Wooley, both of Rochester, N.Y.

[73] Assignee: Eastman Kodak Company, Rochester, N.Y.

[21] Appl. No.: 412,404

[22] Filed: Mar. 28, 1995

[51] Int. Cl.⁶ .............................. G02B 5/32; G02B 26/10; G02B 11/06

[52] U.S. Cl. .................... 359/17; 359/662; 359/206; 359/202

[58] Field of Search .................... 359/662, 206, 359/202, 17, 761, 762, 770

[56] References Cited

U.S. PATENT DOCUMENTS

| | | | |
|---|---|---|---|
| 4,343,531 | 8/1982 | Tateoka et al. | 350/6.5 |
| 4,400,063 | 8/1983 | Hayashida | 359/662 |
| 4,527,858 | 7/1985 | Takahashi et al. | 350/6.8 |
| 4,574,197 | 3/1986 | Kliever | 250/334 |
| 4,714,830 | 12/1987 | Usui | 250/234 |
| 4,714,960 | 12/1987 | Laakmann | 358/206 |
| 4,736,110 | 4/1988 | Awamura | 250/578 |
| 4,828,375 | 5/1989 | Dong et al. | 350/475 |
| 4,863,250 | 9/1989 | Ishizuka | 359/662 |
| 4,880,299 | 11/1989 | Hamada | 359/662 |
| 4,904,034 | 2/1990 | Narayan et al. | 350/3.71 |
| 4,946,234 | 8/1990 | Sasada et al. | 350/6.6 |
| 5,031,979 | 7/1991 | Itabashi | 350/6.8 |
| 5,055,663 | 10/1991 | Morimoto et al. | 250/201.4 |
| 5,087,987 | 2/1992 | Simbal | 359/663 |
| 5,111,325 | 5/1992 | DeJager | 359/206 |
| 5,247,385 | 9/1993 | Takanashi | 359/206 |
| 5,270,851 | 12/1993 | Makino et al. | 359/206 |

OTHER PUBLICATIONS

R. E. Hopkins and M. J. Buzawa, "Optics for Laser Scanning", Optical Engineering, 15, 2, 1976, pp. 90–94.
"Holographic Scanners, Applications, Performance and Design" by Glen T. Spincerbox, in Laser Beam Scanning ed. by Gerald F. Marshall, Marcel–Dekker, New York, 1985, pp. 41–45.

*Primary Examiner*—Jon W. Henry
*Attorney, Agent, or Firm*—Svetlana Z. Short

[57] ABSTRACT

A scanner configured to provide a two-dimensional scan of a radiation beam moving along the path, including two deflectors and a scan lens located downstream in the path of the beam from the deflectors and separated from the farthest deflector by air equivalent distance at least equal to the focal length of the scan lens.

22 Claims, 17 Drawing Sheets

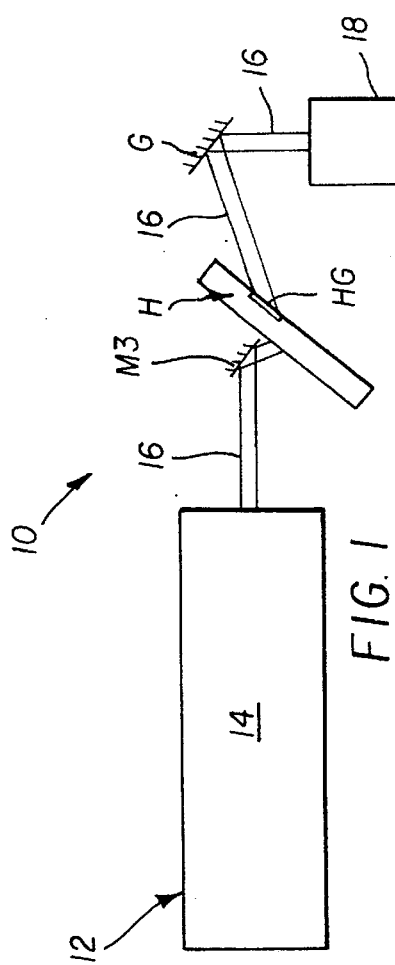
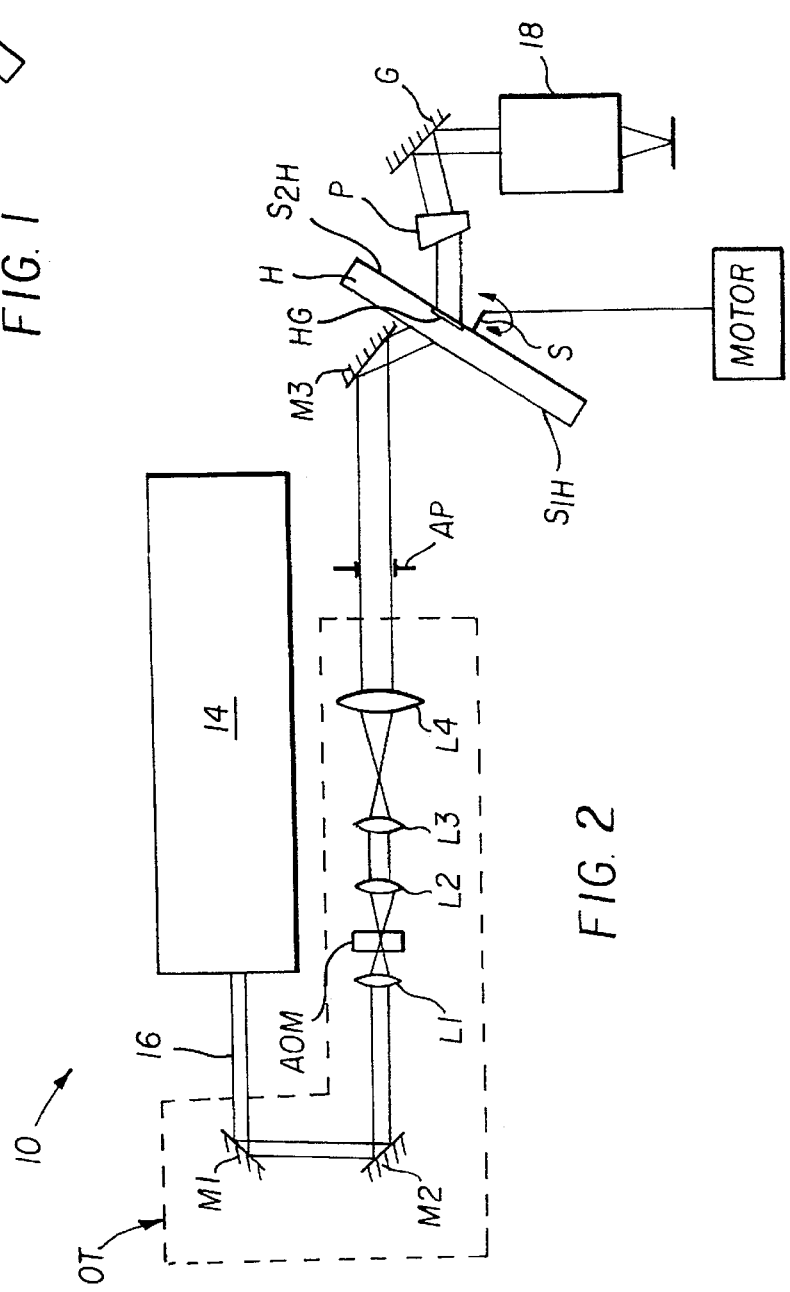

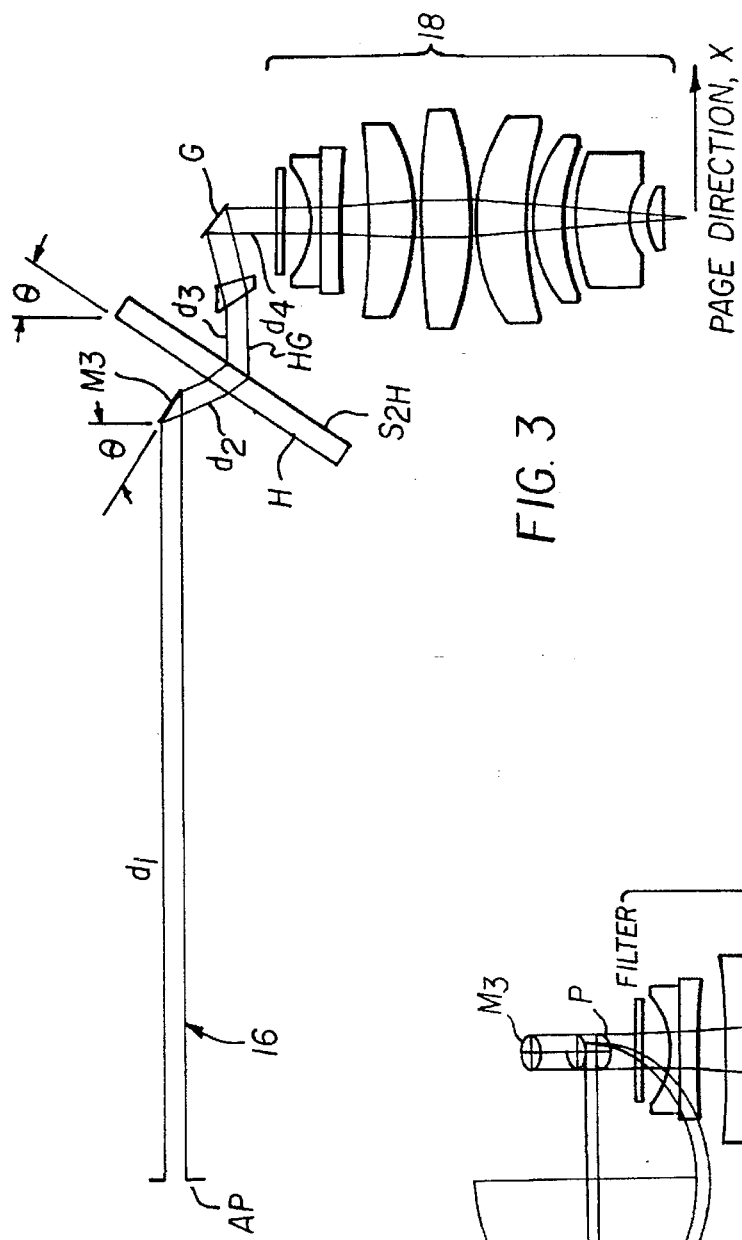
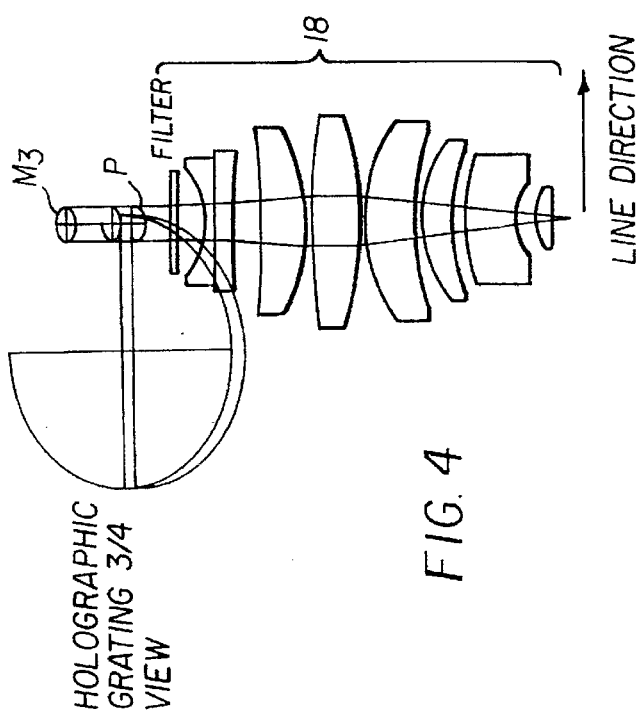
FIG. 3
FIG. 4

------- GALVO ROTATION = 0.00, X IMAGE = 0.00 mm
- - - - - GALVO ROTATION = 1.52, X IMAGE = 1.43 mm
---- ---- GALVO ROTATION = 3.03, X IMAGE = 2.85 mm
---- ---- GALVO ROTATION = 3.79, X IMAGE = 3.57 mm

SCAN LENS AND AN OPTICAL SCANNER SYSTEM INCORPORATING TWO DEFLECTORS

This invention relates generally to a scanner system for providing a two-dimensional scan of a radiation beam, for example, from a laser.

More particularly, it relates to scan lenses or scan lens systems used in pre-objective optical scanning systems for focusing a beam of radiation being deflected by scanned deflectors.

Most pre-objective optical scanning systems use a laser and single scanner to provide spot motion in the "fast scan" or "line" direction. The positioning of the spot in the "slow scan" or "page" direction is controlled by motion of the recording material. For example, this method is generally employed in laser printers.

A pre-objective laser scanning system (i.e. an optical scanning system employing a laser in which deflectors are located in front of a scan lens) employing two scanning deflectors, which control the deviation of the beam in orthogonal directions, allows the recording material to remain motionless during the recording process. We recognized that this allows a simpler transport mechanism for the recording material, such as paper or film, because the transport mechanism is only required to move the recording material into position before the recording begins and to remove it after the recording is finished. Thus, the image quality written onto such recording material in a dual deflector scanning system is no longer affected by the precision of the page direction recording material transport mechanism. We also recognized that this is an especially important advantage for small format recording materials, such as microfilm or microfiche, because the need for a film transport mechanism which will accurately position the film to tolerances of less than 1 µm is eliminated.

U.S. Pat. No. 4,714,960 discloses an optical scanner system with more than one light path or more than one deflection. This scanner was designed to be "television compatible" and utilized a polygon scanner and an afocal lens system for imaging on a detector array. Neither requirements imposed by such an optical scanner system on the scanning lens system, nor the configuration of a scanning lens system were disclosed.

U.S. Pat. No. 4,736,110 discloses a dual deflector image pick-up apparatus. The configuration of the scan lens is also not disclosed.

Finally, U.S. Pat. No. 4,714,830 describes a light beam positioner having dual deflectors. Again, there is no disclosure of the objective (or scan) lens.

We found that using this two-deflector scheme introduces new and unusual requirements onto the scan lens. The use of two scanning deflectors in front of the scan lens means that the first deflector is now located at a greater distance from the scan lens than has been customary in prior art. The aberrations of the scan lens must be corrected for a scanning deflector located at a great distance from the lens. It has long been recognized that the design of scan lenses for use in pre-objective single detection scanning systems is greatly complicated when the scanner is located at large distances from the scan lens, because the location of the scanning deflector defines the entrance pupil for the scan lens. For example, Hopkins and Buzawa state that "A lens optimized for an entrance pupil located at the scanning element has quite a different form compared to a normal lens with an internal aperture stop. Unfortunately, this requirement tends to increase the complexity and size so every effort should be made to minimize the distance between the lens and the scanner" (R. E. Hopkins and M. J. Buzawa, "Optics for Laser Scanning", Optical Engineering, 15,2,1976, pages 90–114). Prior pre-objective single deflector scanners are limited to arrangements in which the scan lens is located between 15% and 100% of the scan lens focal length behind the deflectors. Lenses of this type are described in U.S. Pat. Nos. 5,087,987; 5,031,979; 4,527,858; and 5,111,325.

Our requirement that the first scan lens be located a large distance away is complicated by the fact that the scan lens must be corrected for two deflector positions. Prior art showed no such lenses and disclosed no pre-objective scanning system employing such a scan lens.

Finally, it was discovered that a line bow problem, typically present with a single, pre-objective scanner, is more difficult to correct in a dual scanner system.

The problems of line bow in holographic scanners incorporating one deflector are discussed in the article entitled "Holographic Scanners, Applications, Performance and Design" by Glen T. Spincerbox, in "Laser Beam Scanning" ed. by Gerald F. Marshall, Marcel-Dekker, New York, 1985, pgs. 41–45. B. Narayan, in U.S. Pat. No. 4,904,034 describes a method to minimize the line bow produced by a pre-objective scanner using a single holographic scanning system. However, no prior art is known concerning line bow correction when a holographic grating is used as the line direction deflector in a dual deflector pre-objective scanner system.

It is an object of the present invention to produce an improved pre-objective scanner.

According to the present invention, a scanner configured to provide a two-dimensional scan of a radiation beam moving along a path includes: (1) a first deflector for deflecting the beam through a first scan direction at a first angular velocity; (2) a second deflector for deflecting the beam through a second scan direction at a second angular velocity substantially orthogonal to the first scan direction; and (3) a scan lens located downstream in the path of the beam from the deflectors for focusing the beam to a spot on a surface, the scan lens having appropriate distortion characteristics to insure that a linear velocity of the spot on the surface is proportionate to the angular velocity of both said deflectors.

It is also an object of the present invention to produce an improved objective lens (or scan lens) for an optical scanning system.

It is yet another object of the present invention to produce an objective lens (i.e. a scan lens) for an optical scanning system which is corrected for two deflector positions or two stop locations.

As stated above, we discovered that a scan lens used with a dual-deflector pre-objective scanning system must meet special requirements that are not necessary for scan lenses used with a single scanning deflector. These requirements are described below in detail. Scan lenses meeting these conditions are not known.

1. In dual-deflector scanner systems, the scan lens aberrations must be well corrected for any combination of rotations by either or both of the two deflectors. Since the deflector position in the pre-objective optical scanning system defines the entrance pupil for the scan lens, this is equivalent to stating that the performance of the scan lens must also be corrected when the stop is shifted between the locations of the two deflectors. Since the chief ray moves transversely as the pupil is shifted longitudinally, the aberrations of the scan lens must be corrected over a larger pupil diameter than the actual diameter of the laser beam entering the scan lens.

These objects and requirements can be achieved by a lens (also called a scan lens or a scanning lens) for projecting a beam of radiation moving along an optical path from front to rear, the lens comprising three groups of lens elements in order: (1) a negative group with a front-most lens element concave to the front; (2) a first positive group of lens elements having at least two positive power lens elements and no negative lens elements, the first lens element of the first positive group having its strongest surface facing the rear; and (3) a second positive group of lens elements, the second positive group having stronger optical power than the first positive group, the second positive group including at least one positive meniscus lens component which is concave to the rear. It is preferred that $$-1.65 \leq \frac{efl_1}{efl} \leq -0.86,$$

$$0.60 \leq \frac{efl_2}{efl} \leq 1.36, \text{ and}$$

$$2.47 \leq \frac{efl_3}{efl} \leq 4.65,$$

where efl is the focal length of said scanning lens, $efl_1$ is the focal length of said first negative lens group, $efl_2$ is the focal length of said first positive lens group and $efl_3$ is the focal length of said second positive lens group.

According to one of the embodiments of the present invention, the negative group consists of a single lens element satisfying the following condition:

$$0.58 \leq X \leq 0.65$$

where X is the bending of the single lens element.

According to another embodiment of the present invention, the negative group comprises a plurality of lens elements and the first lens element of this group meets the following bending condition:

$$0.82 \leq X \leq 1.02.$$

According to a preferred embodiment of the present invention, the first positive group comprises three positive lens elements, the three positive lens elements satisfying the following conditions:

$$-1.70 \leq X'_1 \leq 0.94,$$

$$-0.46 \leq X'_2 \leq -0.26, \text{ and}$$

$$-1.98 \leq X'_3 \leq 5.22,$$

where $X'_1$, $X'_2$, and $X'_3$ represent the bending of the first, second and third consecutive lens elements of the first positive group.

According to yet another embodiment of the present invention, the second positive group consists of two lens components and satisfies the following conditions:

$$-3.11 \leq X''_1 \leq -2.56, \text{ and}$$

$$2.05 \leq X''_2 \leq 2.21,$$

where $X''_1$ is the bending of the first lens component of the second positive group and $X''_2$ is the bending of the second lens component of the second positive group.

2. It is another object of the present invention to produce an optical scanning system wherein, the linear scanning velocity on the recording material be proportional to the angular velocity of each of the scanning deflectors.

This object requires introducing the correct amount of negative distortion into the design of the scan lens, taking into account the effects of stop shifting on distortion. For the case where the "fast" or "line" scanning is controlled by a rotating holographic gratings, the distortion characteristics of the scan lens must be balanced between the aforementioned need to achieve scan linearity and the need to minimize line bow over the entire range of the "page" or "slow" deflector.

As stated above, the aforementioned object of the present invention can be achieved by a scanner configured to provide a two-dimensional scan of a radiation beam moving along a path, comprising: (1) a first deflector for deflecting the beam through a first scan direction at a first angular velocity; (2) a second deflector for deflecting the beam through a second scan direction at a second angular velocity, said second scan direction being substantially orthogonal to said first scan direction; and (3) a scan lens located downstream in the path of the beam from these deflectors for focusing the beam to the spot on a surface, the scan lens having appropriate distortion characteristics to insure that a linear velocity of the spot on the surface is proportionate to said first and second angular velocities.

According to a preferred embodiment of the present invention, a scan lens comprises three units of lens elements located in order in the direction of the beam, a first negative power lens unit, a second positive power lens unit and a third positive power lens unit, wherein the second, positive power lens unit is primarily responsible for introducing the distortion characteristics.

BRIEF DESCRIPTION OF THE DRAWINGS

Several embodiments of the present invention will now be described, by way of example, with reference to the accompanying drawings in which:

FIG. 1 is a simplified schematic of the side view of the optical scanner system 10 according to the preferred embodiment of the invention;

FIG. 2 is a more detailed schematic of the optical scanner system 10 of FIG. 1;

FIG. 3 is a side view of the back portion of an optical scanner system 10 shown in FIG. 1;

FIG. 4 is a top view of the back portion of the optical scanner system 10 illustrated in FIG. 3;

DESCRIPTION OF THE PREFERRED EMBODIMENT

Figure 5:
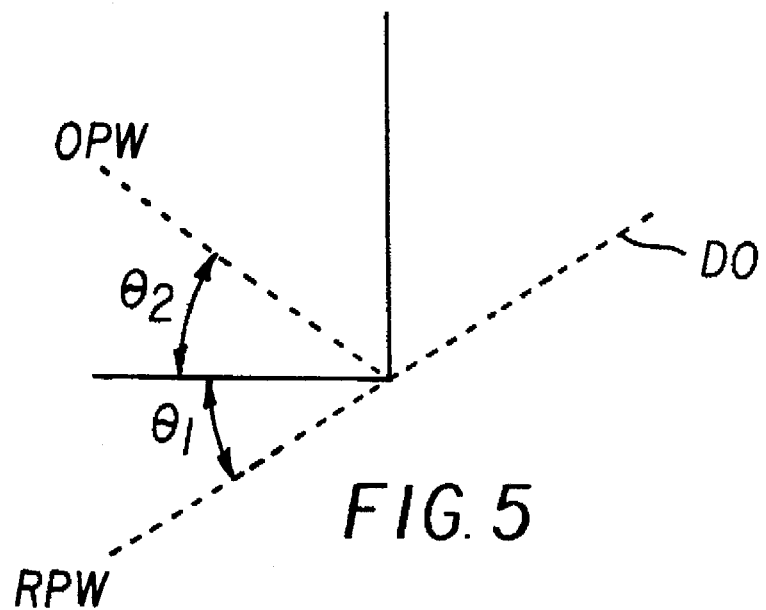
FIG. 5 illustrates the direction of the object plane wave (OPW) and the reference plane wave (RPV) for the holographic grating utilized in the optical scanner system 10.

Although the present invention is not limited to use as a laser printer, the scan lens 18 as well as the optical scanner system 10 described herein are particularly relevant in that the present invention may be deemed to be an improvement in laser printers.

In particular, the present invention comprises a series of scan lenses suitable for use in pre-objective scanning systems where the distance between the scanning deflector and the scan lens is between 40% and 260% of the scan lens focal length. Several embodiments of the current invention are corrected to work in pre-objective scanning optical systems incorporating two deflectors. The aberrations in these is embodiments are corrected over larger pupils than those occupied by the input laser beam to handle the stop-shift effects inherent in the dual deflector scanning systems. These embodiments are also corrected for scan linearity at both deflector positions. The preferred embodiments of this invention are also corrected to minimize line bow over the entire page when the "line" or "fast scan" deflector is a holographic grating and the "slow" or "page" deflector is a galvanometer driven mirror and the line bow for zero page direction deflection is corrected using the method described by B. Narayan in U.S. Pat. No. 4,904,034. That is, the prism is minimizing the line bow when the galvonometer is in its home position (zero page deflector) —i.e. where it is not deflecting at all. The additional correction is performed by a scan lens as deflection is performed in a page deflection.

The present invention includes embodiments having two different focal lengths. When used with a pre-objective dual-deflector scanning system disclosed here, these embodiments produce high quality images over standard microform formats. These formats are:

24X Format: 9.00 mm×11.64 mm;

42X Format: 8.46 mm×6.65 mm; and

48X Format: 7.42 mm×5.82 mm.

It is desirable to change the image size by replacing one scan lens with another scan lens having a different focal length. Thus, according to a preferred embodiment of the present invention, the locations of the entrance pupils and image plane for the second scan lens remain in the same location as for the first scan lens, despite the change in focal length from one scan lens to another.

Thus, the preferred embodiments of the current invention share the same location for scanning deflectors and image plane although they have different focal lengths. This allows easy substitution of scan lenses to change the format over which the image is written.

One scan lens is used for both the 42X and the 48X mode. This lens is replaced by a second lens when the scan system is operating at a 24X mode. The focal length of the 42X/48X lens is approximately 27 mm. The focal length of the 24X lens is approximately 54 mm. Multiple embodiments for the scan lenses of both focal lengths are presented here.

Reference will now be made to FIG. 1, wherein it will be seen that laser printer compatible optical scanner systems of the present invention comprises: 1) a light source 12, such as a laser or a laser diode 14 for providing a largely collimated light beam 16; 2) a holographic grating scanner H for scanning a surface to be scanned (i.e. a writing surface) in one direction (line direction); 3) a galvo mirror G for scanning this surface in another direction (page direction); and 4) the scan lens or the scanning lens system (or f/θ lens) 18 for focusing the deflected light beam 16 on the aforementioned writing surface WS, such as paper or film.

Figure 7:
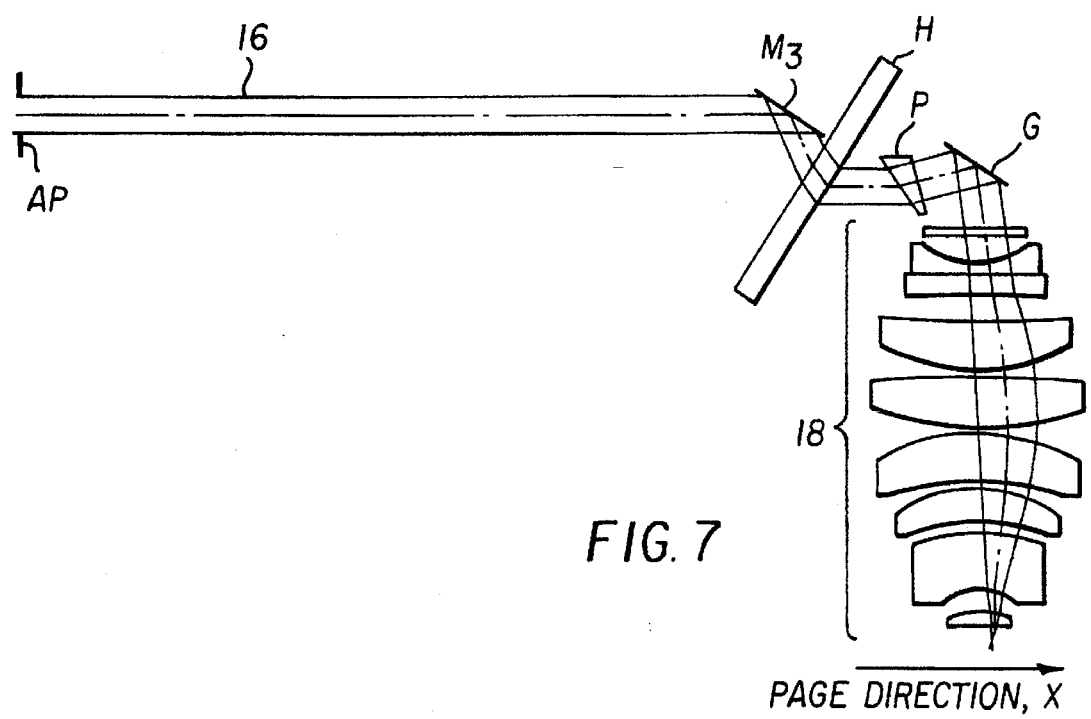
FIG. 7 illustrates a side view of the portion optical scanner system 10 shown in FIG. 3, but at zero holographic grating rotation and maximum galvo rotation.
Figure 8:
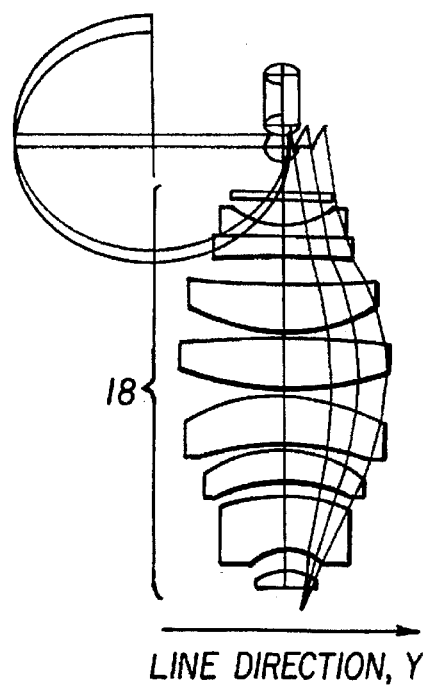
FIG. 8 illustrates a top view of the portion of the optical scanner system 10 illustrated in FIG. 7, but at zero galvo rotation and at maximum holographic grating rotation.

FIGS. 3 and 4 illustrate the back portion of the optical scanner 10, including scan lens 18. These figures show a scan at zero page and zero line direction. All distances $d_i$ are measured in mm and are measured along the chief ray at zero holographic grating and galvo rotation. FIG. 7 shows the same view but at the maximum galvo rotation, zero holographic grating rotation. FIG. 8 shows zero galvo rotation, maximum holographic grating rotation.

More specifically (with reference to FIGS. 2–8), according to this embodiment, a gas laser 14 ($\lambda$=632.8 µm) provides an essentially collimated beam 16. A laser diode could also be used if appropriate beam-shaping optics is used. Laser beam 16 then passes through an optical train OT, including an acousto-optic modulator (AOM) and a beam-shaping optics and assumes an elliptical cross-section. Specifically, an optical train comprises: i) folding mirrors M1 and M2 for folding the beam in order to produce a compact optical system; ii) a focusing lens L1 for focusing a laser beam 16 at a predetermined location, thereby producing a waste $W_1$ of predetermined size; iii) a modulator such as an acousto-optic modulator (AOM) for modulating the laser beam 16, another lens L2 having its focus located at the waist location for collimating the beam; and iv) beam expanding optics L3 and L4 for expanding the beam size as needed. The laser beam 16 assumes an elliptical cross-section upon leaving the modulator AOM and has and still has an elliptical cross-section as it leaves the beam expanding optics L3 and L4. The beam 16 then passes through an elliptically-shaped aperture AP (FIGS. 2 and 3) and impinges on a fold mirror M3. The elliptically-shaped aperture's diameter is 9.56 mm×5.98 mm (line x page). The distance $d_1$ from the aperture AP to the fold mirror M3 is 143.073 mm. The reflective surface of the fold mirror M3 is inclined at an angle θ=57°. The fold mirror M3 (FIG. 3) folds the beam 16 and directs it at the appropriate angle towards a holographic grating scanner H or hologon H. The distance $d_2$ between the fold mirror M3 and the holographic grating scanner H is 14.562 mm.

The holographic grating scanner H is mounted on a spindle S (FIG. 2) and is spun by it. The spindle is connected to a motor MOT which imparts it with a rotational movement. The rear surface $S_{2H}$ of the hologon H contains several facets or gratings HG. As the facet HG swings by, the beam 16 moves in the line direction scanning the writing surface. However, absent corrective optics, the resultant line will not be a straight line, but a curved one-i.e. it will be "bowed" instead. This "bow" is corrected by a prism P located behind the hologon H.

The holographic grating scanner H (or the hologon H) comprises a body of optically transparent material having an index of refraction 1.54266 (at λ=632.8 μm). It has a front plano surface $S_{1H}$ and a rear surface $S_{2H}$. The body of the hologon forms a substrate 6.35 mm thick and it is also inclined an angle θ=57°. As stated above, the rear surface of the hologon, $S_{2H}$, has a number holographic gratings HG. The light beam, such as the laser beam 16 impinges on a hologon, refracts through a plano refractive surface $S_{1H}$, passes through the body of the hologon and impinges on a rear surface $S_{2H}$ which has a holographic grating HG. The directions of the object plane wave and the diffracted order are illustrated in FIG. 5, where $\theta_1=\theta_2=33°$. In the figure, OPW stands for the object plane wave, RPW stands for the reference wave and DO stands for −1 diffractive order. The construction wavelength is 632.8 μm.

Figure 6:
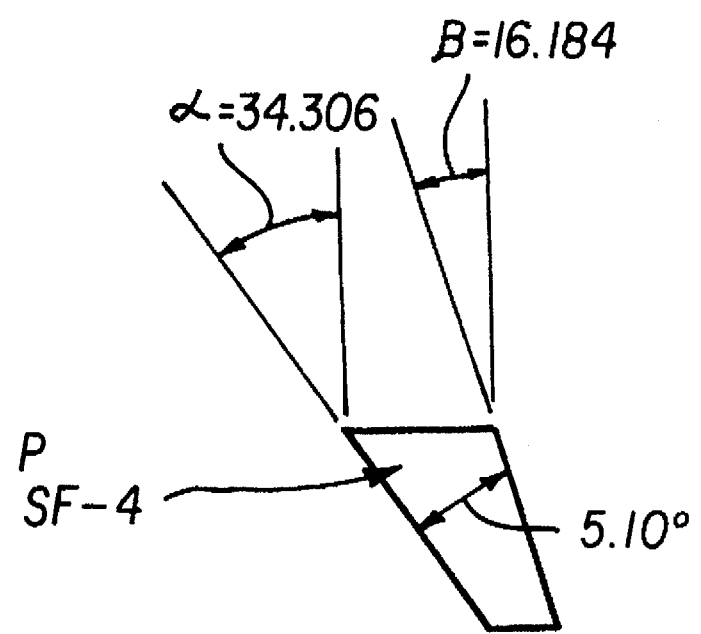
FIG. 6 illustrates the construction and orientation of prism P utilized in the optical scanner system 10.

The holographic grating HG diffracts and in turn rotates the laser beam by the appropriate amount, eventually providing line scan on the photosensitivity surface such as film, for example. The out coming light beam then passes through the prism P which corrects for the "bow" and which changes the ellipticity of the laser beam cross-section. The distance $d_3$ between the rear surface $S_{2H}$ of the holographic grating scanner and the prism is 19.964 mm. The construction of the prism P is illustrated in FIG. 6. Upon leaving the prism P the light beam 16 is directed towards a galvo mirror G and then impinges on it. At zero galvo mirror G rotation (i.e. at zero galvo position) there is essentially no "bow". The distance between the prism P and the galvo mirror G is 17.0 mm (measured along the chief ray for no rotation of holographic grating).

The galvo mirror G rotates in order to move the beam 16 in an orthogonal direction, thereby providing a scanning function in the page direction. The galvo mirror G is acted upon by a galvanometer which causes the galvo mirror to rotate at the appropriate speed to scan the above mentioned writing surface. The beam 16 reflects from the galvo mirror G towards the lens system 18 which focuses it on the writing surface. The distance between the galvo mirror G and the lens system 18 is 16.870 mm.

Thus, according to the present invention, the optical scanner system 10 incorporates two mechanical deflectors. According to this embodiment they are a holographic deflector H and a galvo mirror G. In a laser printing system, the deflector is required to sit in the entrance pupil of the scan lens system for proper operation of the system. The use of two mechanical deflectors imposes special conditions on the location of the entrance pupil for the scan lens 18. Because the optical scanner system uses two optical deflectors, the lens system 18, which is used as a scan lens, is designed to accommodate and to be corrected for two entrance pupil locations—one located at the galvo mirror and another located at the hologon surface $S_{2H}$.

The optical scanner system 10 illustrated in FIGS. 1–4, 7 and 8 has an F/number (F/#) F/2.82 and the back focal length B.F. of 4.05 mm. The performance parameters and the analysis for the back portion of the optical system (shown in FIGS. 3 and 4) including the scan lens 18 are provided in Table 1. The light beam 16 is a coherent light beam centered around the center wavelength λ=632.8 μm, which corresponds to the HeNe line.

TABLE 1

NOTES:
1. F/# = 2.82
   BF = 4.0461
   EF = 26.92
   FORMATS: 48× MODE: 7.758 × 6.244
   (HOLOGON × GALVO) (LINE × PAGE)
   42× MODE: 8.866 × 7.136
   (HOLOGON × GALVO) (LINE × PAGE)
2. CONFIGURATION INFORMATION FOR LENS
   BENCH TESTING:

| DEFLECTION MODE | BF | FF | BEST FOCUS | A**** |
|---|---|---|---|---|
| Hologon | 4.04 | −2.83 | −.0019 | 56.662 |
| Galvo | 4.04 | −2.83 | −.0019 | 16.870 |
| DEFLECTION MODE | N.P. LOC. | N.P.* DIAM. | X.P. LOC. | X.P.* DIAM. |
| Hologon | −65.89 | 9.56 | 14.69 | 3.78 |
| Galvo | −26.10 | 6.84** | 29.69 | 6.52** |
| DEFLECTION MODE | EF | LENS LENGTH | STOP* DIAM. | REL.* APER. |
| Hologon | 26.92 | 98.244 | 9.56 | 2.82 |
| Galvo | 26.92 | 98.244 | 6.84** | 3.93** |
| DEFLECTION MODE | SEMI** FIELD | EDGE OF SCAN | | |
| Hologon | 9.407° | 4.433 | (Max. Line Dir.) | |
| Galvo | 7.571° | 3.563 | (Max. Page Dir.) | |

*These quantities are based on the 9.56 and 5.98 mm diameters of the elliptical aperture for the hologon and galvo mode deflection, respectively. NP stands for the entrance pupil while XP denotes an exit pupil.
**These quantities are adjusted for magnification of by the prism.
***Semi-field angle in scan direction only for 42X mode. Maximum semi-field angle is a compound angle due to both deflectors operating simultaneously.
****"A" is the distance measured from the front-most surface of the filter PL to the entrance pupil location.

3. THIS F-NUMBER IS BASED ON THE FINAL ANGLE FOR A MARGINAL RAY LIMITED BY THE 9.56 MM DIAMETER OF THE ELLIPTICAL APERTURE.
4. THESE CLEAR APERTURES ARE SUFFICIENT TO PASS A BUNDLE LIMITED BY THE ELLIPTICAL APERTURE WHEN THE HOLOGON IS ROTATED BY 8.6296° AND THE GALVO IS ROTATED BY 3.7857°. THIS CORRESPONDS TO THE CORNER OF THE 42× FORMAT DEFINED IN NOTE 1.
5. SCAN LINEARITY - HOLOGON SCANNING:

| HOLOGON ROTATION | 1.7259° | 3.4518° | 5.1778° | 6.9037° |
|---|---|---|---|---|
| DESIRED RAY HT. | 0.887 | 1.773 | 2.660 | 3.546 |
| ACTUAL RAY HT. | 0.884 | 1.768 | 2.654 | 3.542 |
| DIFFERENCE | 0.003 | 0.005 | 0.006 | 0.005 |
| % DIFFERENCE | −0.35 | −0.31 | −0.24 | −0.13 |

| HOLOGON ROTATION | 7.5511°* | 8.6296° |
|---|---|---|
| DESIRED RAY HT. | 3.879 | 4.433 |
| ACTUAL RAY HT. | 3.876 | 4.433 |

TABLE 1-continued

|   |   |   |
|---|---|---|
| DIFFERENCE | 0.003 | 0.000 |
| % DIFFERENCE | –0.08 | 0.00 |

*Edge of 48× Format.

6. SCAN LINEARITY - GALVO SCANNING:

| GALVO ROTATION | 0.7581° | 1.5162° | 2.2743° | 3.0324° |
|---|---|---|---|---|
| DESIRED RAY HT. | 0.714 | 1.427 | 2.141 | 2.854 |
| ACTUAL RAY HT. | 0.712 | 1.425 | 2.138 | 2.853 |
| DIFFERENCE | 0.001 | 0.002 | 0.002 | 0.002 |
| % DIFFERENCE | –0.17 | –0.15 | –0.11 | –0.07 |

| GALVO ROTATION | .3.3167°* | 3.7905° |
|---|---|---|
| DESIRED RAY HT. | 3.122 | 3.568 |
| ACTUAL RAY HT. | 3.121 | 3.568 |
| DIFFERENCE | 0.001 | 0.000 |
| % DIFFERENCE | –0.04 | 0.000 |

*Edge of 48× Fomat

7. LINE BOW PERFORMANCE. LINE BOW IS DEFINED AS THE CHIEF RAY PAGE DIRECTION INTERCEPT WITH HOLOGON ROTATION MINUS THE CHIEF RAY PAGE DIRECTION INTERCEPT WITHOUT HOLOGON ROTATION FOR A FIXED GALVO ROTATION.

| | HOLOGON ROTATION | | | |
|---|---|---|---|---|
| GALVO ROTATION | 3.4518° | 6.9037° | 7.5511° | 8.6296° |
| 3.7095° | | –0.003 | –0.012 | –0.020 |
| 3.3167° | | | –0.013* | |
| 3.0324° | | –0.002 | –0.010 | –0.016 |
| 1.5162° | | –0.001 | –0.005 | –0.008 |
| 0.0000° | | 0.000 | 0.000 | –0.001 |

*Corner of 48× Format.

8. PAGE BOW PERFORMANCE. PAGE BOW IS DEFINED AS THE CHIEF RAY LINE DIRECTION INTERCEPT WITH GALVO ROTATION MINUS THE CHIEF RAY LINE DIRECTION INTERCEPT WITHOUT GALVO ROTATION FOR A FIXED HOLOGON ROTATION.

| GALVO ROTATION | HOLOGON ROTATION | | | | |
|---|---|---|---|---|---|
| | 0.0000° | 3.4518° | 6.9037° | 7.5511° | 8.6296° |
| 3.7905° | 0.000 | 0.007 | 0.016 | | 0.020 |
| 3.3167° | | | | 0.013* | |
| 3.0324° | 0.000 | 0.005 | 0.010 | | 0.013 |
| 1.5162° | 0.000 | 0.001 | 0.002 | | 0.003 |

*Corner of 48× format.

9. WAVEFRONT PERFORMANCE. SCANNING SYSTEM RMS OPD COMPUTED FOR A UNIT AMPLITUDE PLANE WAVE LIMITED BY THE ELLIPTICAL APERTURE SHOWN IN FIG. 3.

| | HOLOGON ROTATION | | | |
|---|---|---|---|---|
| GALVO ROTATION | 0.0000° | 1.7259° | 3.4518° | 5.1778° |
| 3.7905° | 0.053 | | 0.052 | |
| 3.3167° | | | | |
| 3.0324° | 0.037 | | 0.041 | |
| 2.2743° | 0.023 | | | |
| 1.5162° | 0.014 | | 0.020 | |
| 0.7581° | 0.013 | | | |
| 0.0000° | 0.014 | 0.013 | 0.014 | 0.022 |

| | HOLOGON ROTATION | | |
|---|---|---|---|
| GALVO ROTATION | 6.9037° | 7.5511° | 8.6296° |
| 3.7905° | 0.038 | | 0.032 |
| 3.3167° | | 0.038* | |
| 3.0324° | 0.042 | | 0.042 |
| 2.2743° | | | |
| 1.5162° | 0.039 | | 0.039 |
| 0.7581° | | | |
| 0.0000° | 0.036 | | 0.036 |

TABLE 1-continued

*Corner of 48× format.

10. PREDICTED SPOT SIZE. FOR A BEAM WAIST WITH $\frac{1}{e^2}$ INTENSITY RADII OF 4.826 × 3.593 MM (LINE X PAGE) LOCATED AT THE ELLIPTICAL APERTURE SHOWN IN FIG. 3, THE FOLLOWING TABLES GIVE PREDICTED $\frac{1}{e^3}$ INTENSITY RADII FOR THE STATIC SPOT IN THE IMAGE PLANE. $W_{LINE}$ IS THE $\frac{1}{e^2}$ INTENSITY RADIUS IN THE LINE DIRECTION. $W_{PAGE}$ IS THE $\frac{1}{e^2}$ INTENSITY RADIUS IN THE PAGE DIRECTION.

$W_{LINE}$ (in μM)

| | HOLOGON ROTATION | | | |
|---|---|---|---|---|
| GALVO ROTATION | 0.0000° | 1.7259° | 3.4518° | 5.1778° |
| 3.7905° | 1.72 | | 1.69 | |
| 3.3167° | | | | |
| 3.3024° | 1.65 | | 1.66 | |
| 2.2743° | 1.64 | | | |
| 1.5162° | 1.63 | | 1.65 | |
| 0.7581° | 1.64 | | | |
| 0.0000° | 1.60 | 1.66 | 1.66 | 1.66 |

| | HOLOGON ROTATION | | |
|---|---|---|---|
| GALVO ROTATION | 6.9037° | 7.5511° | 8.6296° |
| 3.7905° | 1.61 | | 1.67 |
| 3.3167° | | 1.63* | |
| 3.3024° | 1.64 | | 1.67 |
| 2.2743° | | | |
| 1.5162° | 1.65 | | 1.70 |
| 0.7581° | | | |
| 0.0000° | 1.66 | | 1.68 |

$W_{PAGE}$ (in μM)

| | HOLOGON ROTATION | | | |
|---|---|---|---|---|
| GALVO ROTATION | 0.0000° | 1.7259° | 3.4518° | 5.1778° |
| 3.7905° | 2.29 | | 2.27 | |
| 3.3167° | | | | |
| 3.0324° | 2.27 | | 2.26 | |
| 2.2743° | 2.24 | | | |
| 1.5162° | 2.21 | | 2.21 | |
| 0.7581° | 2.20 | | | |
| 0.0000° | 2.34 | 2.34 | 2.19 | 2.21 |

| | HOLOGON ROTATION | | |
|---|---|---|---|
| GALVO ROTATION | 6.9037° | 7.5511° | 8.6296° |
| 3.7905° | 2.24 | | 2.24 |
| 3.3167° | | 2.24* | |
| 3.0324° | | | |
| 2.2743° | | | |
| 1.5162° | 2.25 | | 2.28 |
| 0.7581° | | | |
| 0.0000° | 2.25 | | 2.32 |

EMBODIMENTS OF THE SCAN LENS

Next, there will be described a modified scan lens (f/θ lens) used in the above-mentioned optical scanner.

As stated above, because the optical scanner system uses two optical deflectors, the lens system 18, which is used as a scan lens, is designed to accommodate and to be corrected for two entrance pupil locations—one located at the galvo mirror G and another located at the hologon surface $S_{2H}$. The conditions for the lens system 18 (which is also called herein a scan lens or a scan lens system) are:

1. The entrance pupil of the scan lens system must be located a great distance in front of the first glass element to allow room for the mechanical deflectors and their associated mechanical features. In the case of the lens system disclosed in Example 1 (Table 2), one of the entrance pupils is located a distance of 2.6 times the focal length in front of the first glass surface. An examination of prior art indicated that there are no designs where the entrance pupil is located at a distance greater than 100% of the focal length.

2. The performance of the scan lens must be corrected simultaneously for two different entrance pupil locations corresponding to each mechanical deflector. No designs of this type are known.

It should be noted that, although the lens systems described herein are designed specifically for a laser printer system using a holographic deflector and a galvanometer deflector, the two requirements described above are independent of the deflector technology and the lens system such as lens system 18, for example, can be used with any dual deflector pre-objective optical scanner.

In addition, the design of a scan lens requires resolution of the following three problems:

1. It is important that the linear velocity of the spot across the photosensitive medium such as film remain proportional to the angular velocity of the deflector to achieve uniform power density incident on the film during the scan.

2. Holographic grating scanners introduce line bow into the scan line. It is important to keep this line bow minimized to an acceptable level. This problem is more complicated in a scanner with two deflectors because the distortion of the scan lens, which controls the scan linearity described in item 2, causes differing amounts of line bow at each page location. The distortion of the scan lens must be carefully tailored to provide both acceptable scan linearity and acceptable line bow.

3. The correction of the point-to-point aberrations must be small enough that the size of the spot produced by the laser does not grow appreciably over the film during scanning. These aberrations are generally measured in OPD (Optical Path Difference) terms for scanning systems. For scanners using two deflectors, it is important that the OPD remains well corrected during deflection of the beam by either scanner.

The scan lens 18 of the preferred embodiments comprises three groups (or units), each group being possibly comprised of a plurality of lenses. The three groups are:

1. a negative group, comprising one or more lens components. This negative group is located closest to the scanning deflector.

2. a weaker positive group, comprising one or more lenses, which is located behind the negative group.

3. a stronger positive group, comprising one or more lenses which is located closest to the image plane.

It is preferred that the focal lengths of the three groups satisfy the following relationships:

$$-1.65 \leq \frac{efl_1}{efl} \leq -0.86;$$

$$0.60 \leq \frac{efl_2}{efl} \leq 1.36; \text{ and}$$

-continued $$2.47 \leq \frac{efl_3}{efl} \leq 4.65,$$

where efl is the focal length of the scan lens, $efl_1$ is the focal length of the first group, $efl_2$ is the focal length of the first group, and $efl_3$ is the focal length of the first group.

The scan lens is not symmetrical because the stop position is located at such a great distance from the lens. Consequently, coma can only be corrected by balancing it with spherical aberration. It is preferred that the first negative group in the scan lens introduces this spherical aberration. It is also preferred that coma and astigmatism be introduced by the first negative group in order to achieve correction of scan linearity for the scan lens as a whole.

When the first group consists of a single lens element, it is preferred that this lens element meet the following conditions to introduce the correct amount of these aberrations when the entrance pupil is located at distances greater than 150% of focal length of the scan lens:

$$0.58 \leq X \leq 0.65;$$

where X is the bending, given by:

$$X = (c_1 + c_2)/(c_1 - c_2);$$

where $c_1$ and $c_2$ are the curvatures of the first and second surface of the lens element. The term "bending" means changing the shape of the lens element without changing its power.

For the case where the first group contains multiple elements, it is preferable that the first lens element of the group meet the following bending conditions:

$$0.82 \leq X \leq 1.02.$$

The second lens group of the preferred embodiment completely corrects the lens for scan linearity. It also reduces the backward curving Petzval introduced by the first group, and partially corrects the astigmatism and spherical. Coma is reduced, but not completely corrected, by this group. In order to balance aberrations, it is preferred that the three elements in the second group meet the following conditions when the entrance pupil is located at distances greater than 150% of the focal length of the scan lens:

$$-1.70 \leq X'_1 \leq -0.94;$$

$$-0.46 \leq X'_2 \leq -0.26; \text{ and}$$

$$-1.98 \leq X'_3 \leq 5.22,$$

where $X'_1$, $X'_2$, and $X'_3$ represent the bending of the first, second and third element in the second group, respectively. The bending $X_i$ is defined by:

$$X'_i = (c_1 + c_2)/(c_1 - c_2);$$

where $c_1$ and $c_2$ are the curvatures of the first and second surface of a lens element of the second lens groups.

It is preferred that the third lens group corrects the remaining coma. This group slightly reduces Petzval, astigmatism, and spherical as well, out most of this correction is done by the second group. The third group is also used to correct the line bow when a holographic grating is used to control the fast scan direction. This group is comprised of a plurality of elements. When two elements are used, good correction can be achieved under the following bending conditions:

$-3.11 \leq X''_1 \leq 2.56$; and $2.05 \leq X''_2 \leq 2.21$, where $X''_1$ is the bending of the first lens component of the third lens group and $X''_2$ is the bending of the second lens component of the second group.

Figure 20A:
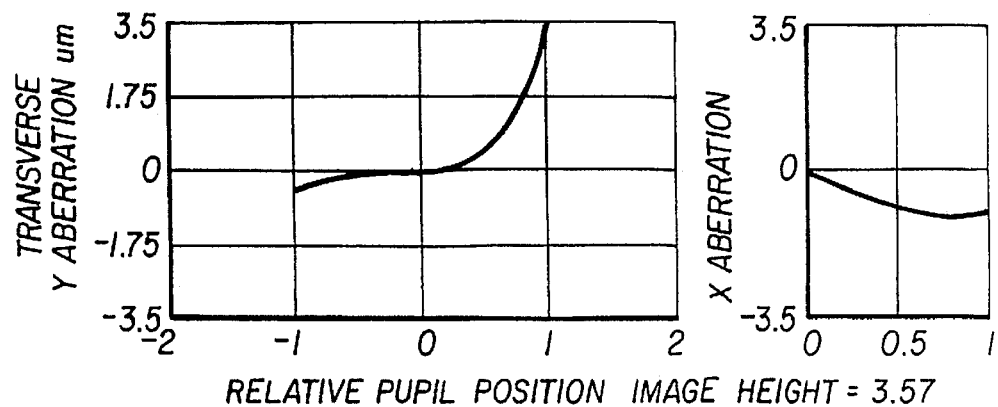
FIGS. 20A–H show the effect of the stop shift on the transverse aberration for the first lens embodiment.
Figure 20B:
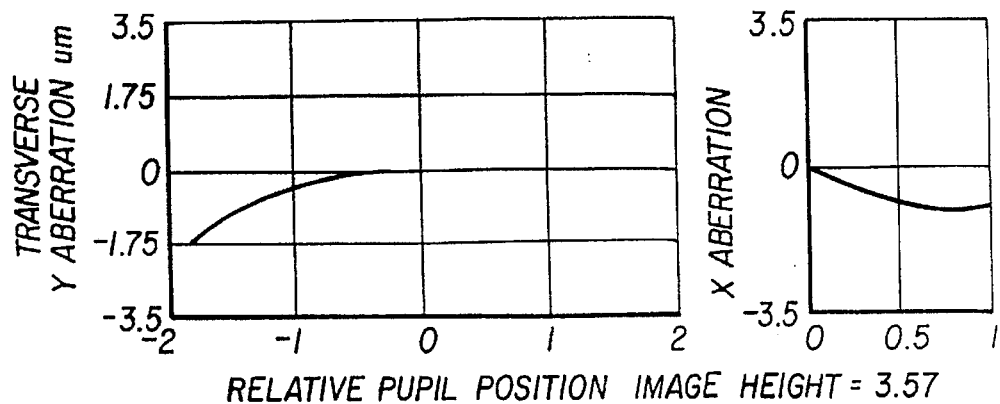
Figure 20C:
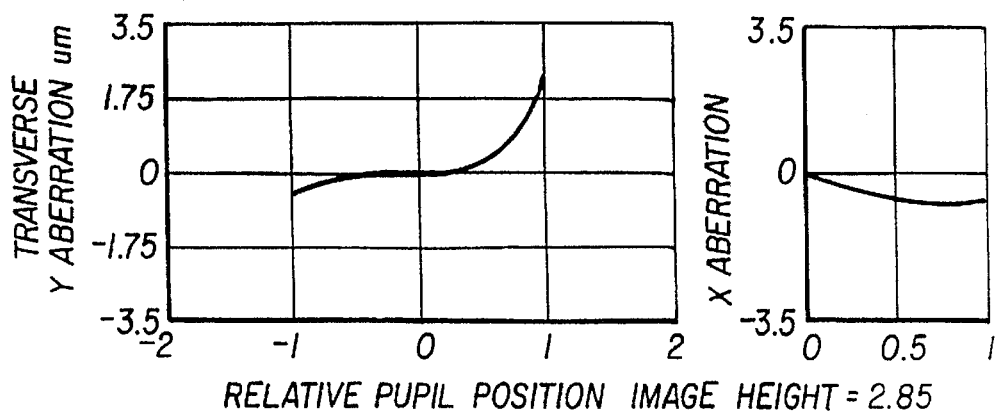
Figure 20D:
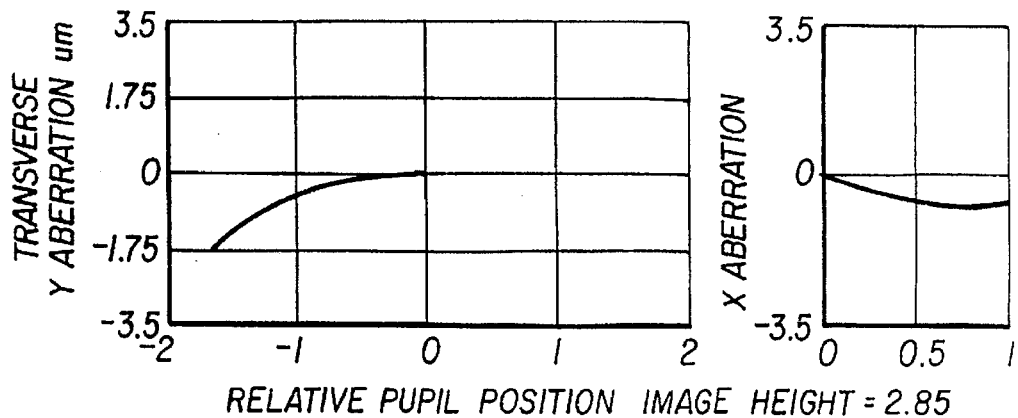
Figure 20E:
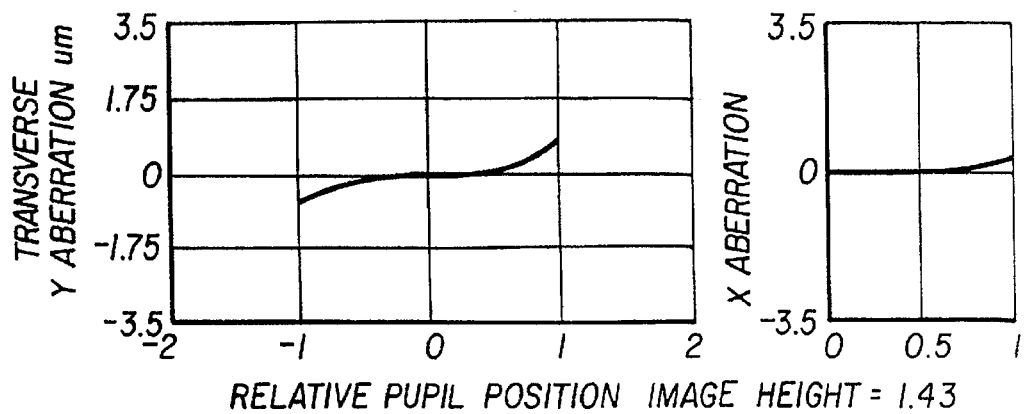
Figure 20F:
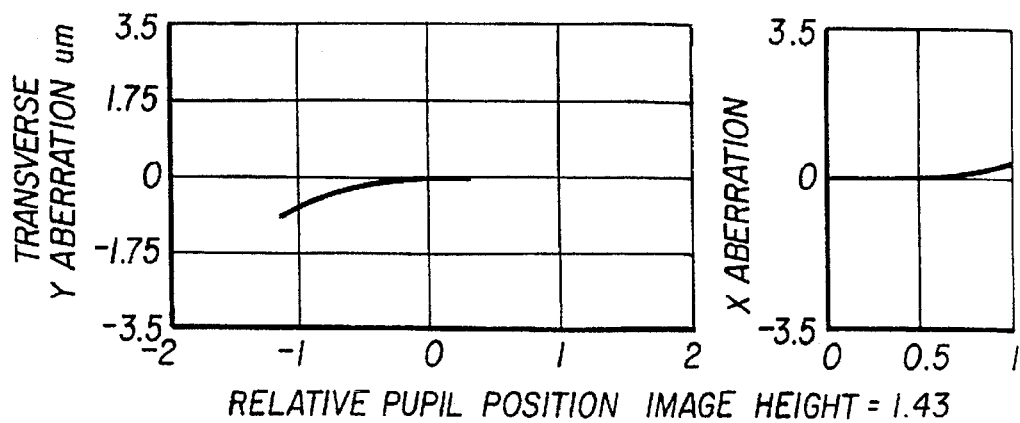
Figure 20G:
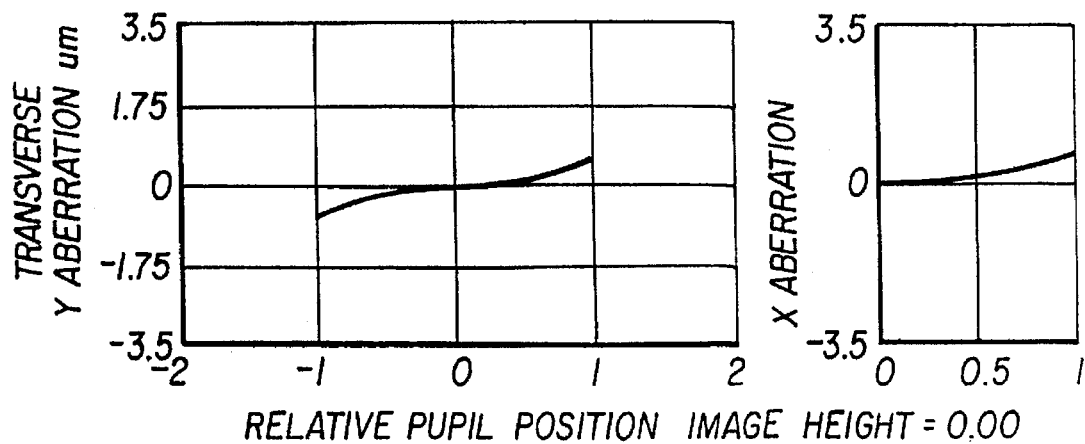
Figure 20H:
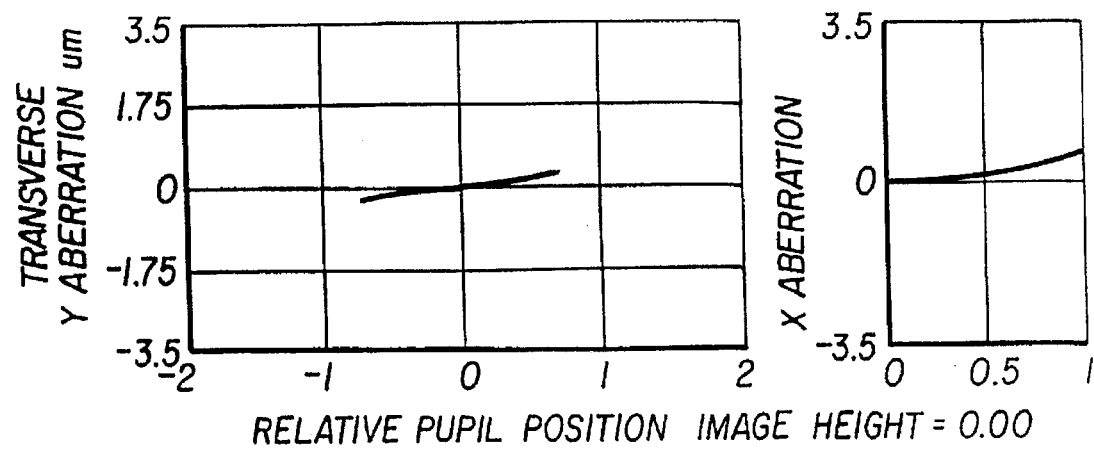
Figure 21:
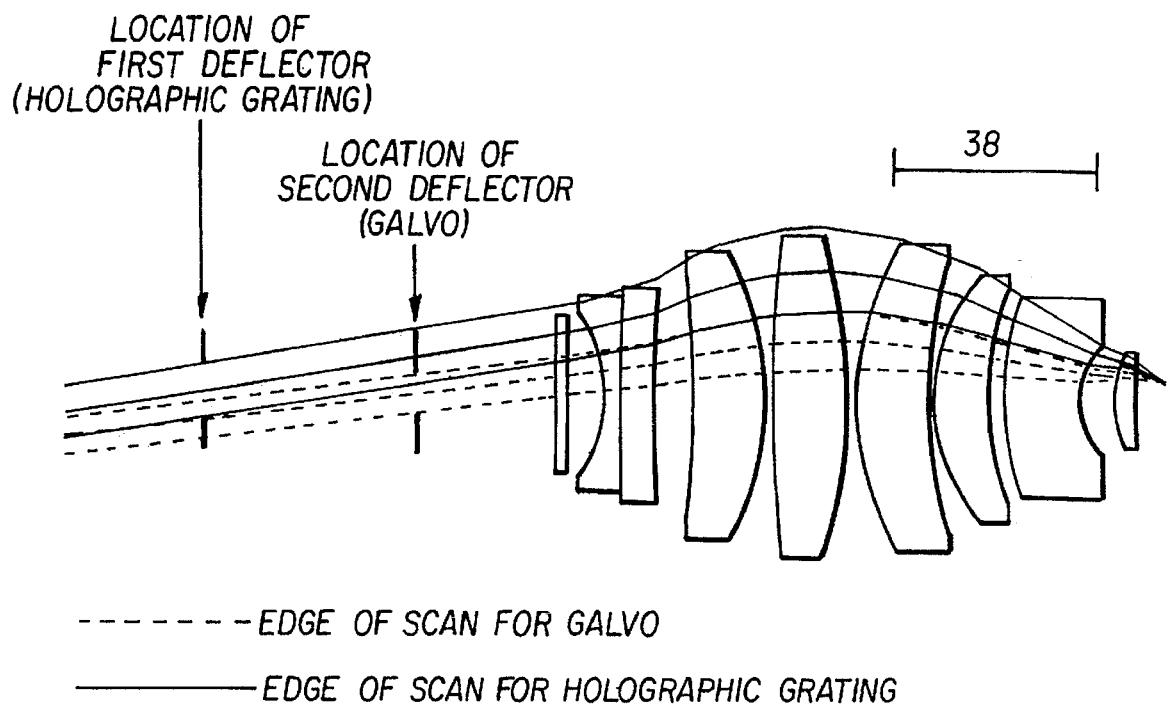
FIG. 21 shows how the use of two deflectors leads to the pupil size being larger than the actual entering beam.

These scan lens aberrations are well corrected for any combination of rotations by both deflectors. This required that the performance be corrected when the stop is shifted between the locations of the two deflectors. Since the chief ray moves transversely as the stop is shifted longitudinally, the aberrations of the scan lens are corrected over a larger pupil diameter than the actual diameter of the laser beam entering the scan lens. This is shown in FIGS. 20 and 21. More specifically:

FIG. 20A shows the transverse aberration over the portion of the pupil used by the holographic grating deflector at an image height of 3.57 mm. Pupil is taken at the position of the holographic grating. The scan lens is described in Example 1;

FIG. 20B shows the transverse aberration over the portion of the pupil used by the galvo deflector at an image height of 3.57 mm. Pupil is taken at the position of the holographic grating;

FIG. 20C shows the transverse aberration over the portion of the pupil used by the holographic grating deflector at an image height of 2.85 mm. Pupil is taken at the position of the holographic grating;

FIG. 20D shows the transverse aberration over the portion of the pupil used by the galvo deflector at an image height of 2.85 mm. Pupil is taken at the position of the holographic grating;

FIG. 20E shows the transverse aberration over the portion of the pupil used by the holographic grating deflector at an image height of 1.43 mm. Pupil is taken at the position of the holographic grating;

FIG. 20F shows the transverse aberration over the portion of the pupil used by the galvo deflector at an image height of 1.43 mm. Pupil is taken at the position of the holographic grating;

FIG. 20G shows the transverse aberration over the portion of the pupil used by the holographic grating deflector at an image height of 0 mm. Pupil is taken at the position of the holographic grating;

FIG. 20H shows the transverse aberration over the portion of the pupil used by the galvo deflector at an image height of 0 mm. Pupil is taken at the position of the holographic grating; and FIG. 21 illustrates stop shift effects due to the use of two deflectors for the scan lens described in Example 1.

Correcting for this larger pupil size requires more elements in the second group. Note that embodiment eleven, which uses two elements in the second groups, does not correct for this condition.

The present invention allows scanning deflectors in scanning systems to be located at a greater distance from the scan lens than prior art. In particular, the scanning deflectors may be located at a distance of 260% of the scan lens focal length.

The present invention allows two scanning deflectors to be used in pre-objective scanning systems, where one deflector provides the "line" or "fast-scan" scanning and the other deflector provides the "page" or "slow-scan" scanning. The aberrations of the lens system of the present invention are corrected to provide high quality images and scan linearity over the entire image.

The present invention allows the use of a holographic grating for the line direction scanning deflector and a galvonometer driven mirror for the page direction scanning deflector in a dual-deflector pre-objective scanning system. Furthermore, the line bow produced by the holographic grating is corrected over the entire image provided the line bow at zero page direction deflection has been corrected by a prism as described by B. Narayan. It is preferred that the scan lens have three lens elements in the rear group to correct the point-to-point aberrations, scan linearity, and line bow. These three lens elements must meet the following bending conditions:

$-1.90 \leq X''_1 \leq -1.80$;

$1.55 \leq X''_2 \leq 1.65$; and $5.30 \leq X''_3 \leq 5.55$.

The present invention includes lenses of different focal lengths having shared scanning deflector positions and image plane positions to allow easy substitution of scan lenses in a scanning system to alter the image size produced by the scanner.

More specifically, the above-mentioned f/θ lenses or scan lenses comprise, in order from an object side: a) a first group, comprising a negative lens component C1' with a concave surface S1 towards the object side. This lens element C1' may be in a form of a biconcave lens component or lens element or a meniscus lens component lens element. It may also be a plano/concave component; b) a second group including at least two positive lens components C2', C3', the lens component nearest to the object side being a first positive lens component or a lens element having a convex surface oriented to the image side, this first positive lens component may be in a form of a meniscus positive lens element, the other lens component being a second positive lens component C3' having a convex surface oriented towards the object side. The second positive lens component C3' may be a biconvex lens component or a plano-convex lens component or even a meniscus lens component; and c) a third group including a thick meniscus lens component C4' having its convex surface oriented towards the object side and its concave surface oriented towards the image side. This third group may also include a small lens component C5' located between said thick meniscus lens component and an image surface. The small lens component has a convex surface facing said thick lens component and may have meniscus, biconvex or convex/plano shape.

The above described lens system has a minimum required number of lens components. Many of the embodiments described below will have one or more additional lens components.

To summarize, this lens system of the preferred embodiment has two entrance pupil positions. The entrance pupils are located in front of the front-most lens component C1'. Lens component C1' has negative optical power and is used to introduce spherical aberrations into the lens system in order to balance coma. The second group includes two to four lens elements, having a large radius of curvature on average. It is used to correct for scan linearity and to partially correct spherical aberration and coma. The function of the third group is to correct the remaining coma and to reduce other residual aberrations.

Figure 9:
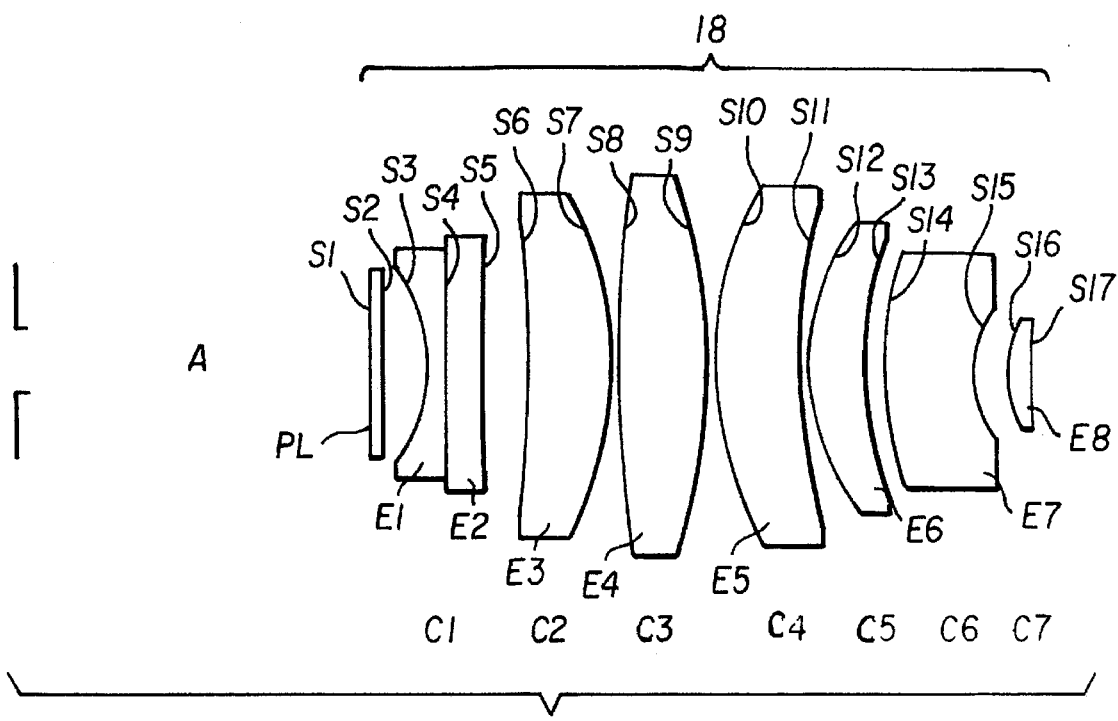
FIG. 9 is a schematic of the side view of the first embodiment of the lens system 18 of the scanner system 10.

The scan lens (or the lens system) 18 of the first preferred embodiment is shown in FIG. 9. The lens system 18 includes a plano-parallel plate PL with no optical power. It has a front most surface S1 and a rear surface S2. The Plate PL serves as a filter and reduces the power of the laser beam 11. It is made from an ordinary crown filter glass. The space A between the entrance pupil position (or the aperture stop AS) and the filter PL has two values corresponding to each of the two deflector positions. The lens system 18 includes seven lens components C1–C7.

The first lens component C1 is a cemented doublet. This cemented doublet comprises a front (i.e. object side) lens element E1 of negative optical power K1, and a second lens element E2. Although the optical power K2 of the lens element E2 also is negative, in this preferred embodiment it is significantly smaller than K1. More specifically, K2/K1≈0.1. The front surface S3 of the lens component C1 is concave and faces the object side. The rear surface S5 of the lens component C1 is slightly concave. Its (absolute) radius of curvature is larger than that of the surface S3. The surface denoted as S4 is an internal interface surface where the elements E1 and E2 are cemented.

The second optical component C2 is a positive power lens element E3. The lens element E3 is a meniscus lens element. It has a front concave surface S6 and a rear (or image side) convex surface S7.

The first preferred embodiment of the scan lens 18 provided for use with an optical scanner 10 is illustrated in FIG. 9. In the drawing, the surfaces S are numbered by sub scripts from front (or object side) of the lens system 18 to the rear, or the image side of the lens system 18. In the table (Table 2), the thickness of the lens elements T and the spacings between elements, including the variable space A, are also located from front to rear. In the tables, spacings and thicknesses are listed in the same line as the surface preceding the thickness or the spacing. All indices N correspond to wavelength λ=587.6 μm. $V_d$ is the abbe number of the lens elements, which according to a standard definition is:

$$V_d = \frac{n_d - 1}{n_F - n_C}.$$

EXAMPLE 1

TABLE 2

| SURF. | CLEAR APER. (5) | AXIAL BEAM | RADIUS | THICK-NESS | INDEX $N_d$ | V-NUMBER | GLASS |
|---|---|---|---|---|---|---|---|
|  | 9.56 | 9.56 | DIAPHRAGM | A |  |  |  |
| 1 | 28.80 | 9.56 | PLANO | 2.000 | 1.517 | 64.2 | BK-7 (Filter) |
| 2 | 29.29 | 9.56 | PLANO | 7.229 |  |  |  |
| 3 | 30.07 | 9.56 | −24.5755 | 2.810 | 1.501 | 56.4 | K-10 |
| 4 | 36.02 | 9.99 | 1212.26 | 6.334 | 1.847 | 23.8 | SFL-57 |
| 5 | 39.94 | 10.66 | 372.272 | 7.222 |  |  |  |
| 6 | 47.26 | 12.21 | −205.807 | 13.500 | 1.847 | 23.8 | SFL-57 |
| 7 | 53.40 | 14.13 | −54.4437 | 1.000 |  |  |  |
| 8 | 58.41 | 14.21 | 255.486 | 14.321 | 1.847 | 23.8 | SFL-57 |
| 9 | 59.72 | 14.23 | −96.7395 | 1.000 |  |  |  |
| 10 | 56.43 | 14.02 | 55.2834 | 13.792 | 1.847 | 23.8 | SFL-57 |
| 11 | 50.07 | 11.55 | 86.0143 | 1.000 |  |  |  |
| 12 | 45.97 | 11.27 | 34.7582 | 9.740 | 1.847 | 23.8 | SFL-57 |
| 13 | 40.10 | 8.70 | 50.4295 | 3.000 |  |  |  |
| 14 | 36.92 | 7.65 | 50.7879 | 15.000 | 1.847 | 23.8 | SFL-57 |
| 15 | 20.27 | 3.74 | 15.0430 | 5.757 |  |  |  |
| 16 | 17.99 | 2.22 | 17.8527 | 3.768 | 1.847 | 23.8 | SFL-57 |
| 17 | 16.55 | 1.46 | 76.2142 |  |  |  |  |

NOTES:
1. Entrance pupil locations are provided in Table 1.
2. $\dfrac{EP_1}{EFL} = 2.45$  $\dfrac{EP_2}{EFL} = 0.97$
where EP1 is the air-equivalent distance to a holographic deflector and $EP_2$ is the air-equivalent distance to a galvo deflector.

The third optical component C3 is a positive power lens element E4. The lens element E4 is biconvex. It has a front convex surface S8 and a rear convex surface S9.

The fourth optical component C4 is a positive power lens element E5. The lens element E5 is a meniscus lens element. It has a front convex surface S10 and a rear (or image side) concave surface S11.

The fifth optical component C5 is a positive power lens element E6. The lens element E6 is a meniscus lens element. It has a front convex surface S12 and a rear (or image side) concave surface S13.

The sixth optical component C6 is a negative power lens element E7. The lens element E7 is a meniscus lens element. It has a front convex surface S14 and a rear (or image side) concave surface S15.

The seventh optical component C7 is a positive power lens element E8. The lens element E8 is a meniscus lens element. It has a front convex surface S16 and a rear (or image side) concave surface S17.

The specific parameters for the scan lens 18 are provided in Table 2. All dimensions are in millimeters.

Figure 22:
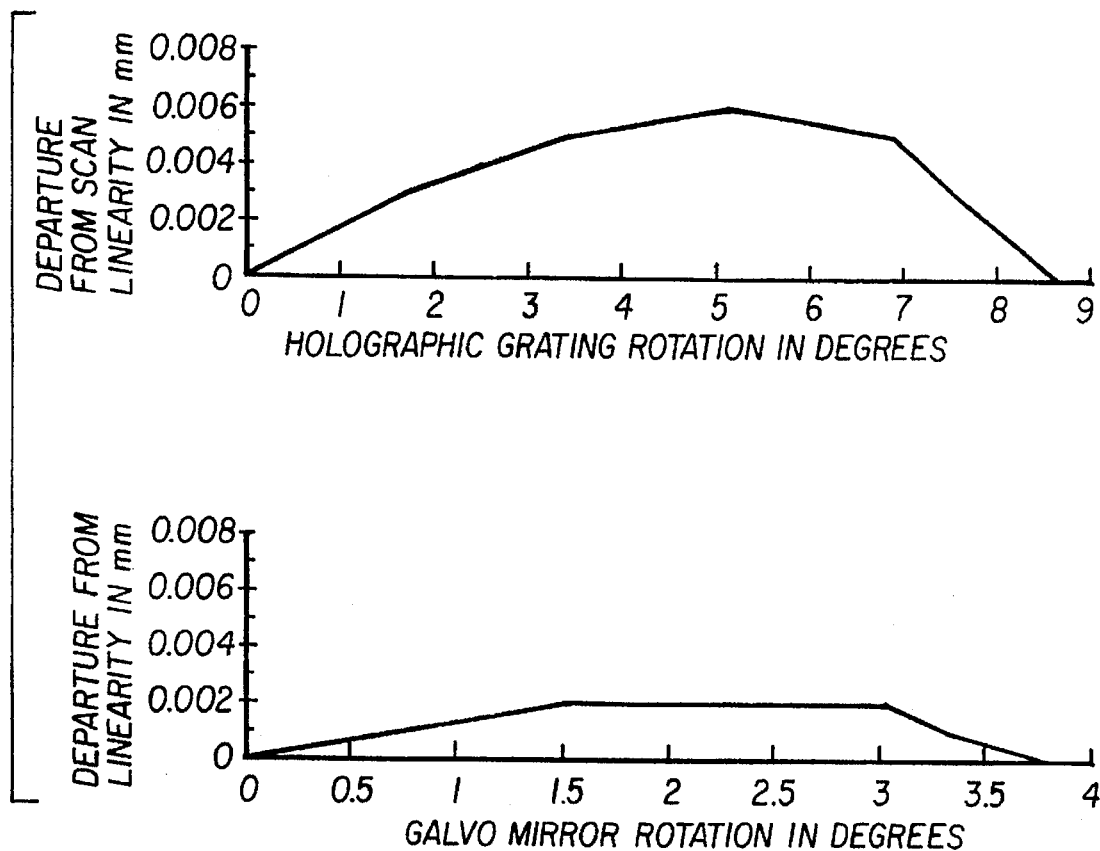
FIG. 22 shows the scan linearity performance of the first preferred embodiment of the present invention.

As stated above, the design of a scan lens requires solving three problems:

1. It is important that the linear velocity of the spot across the photosensitive medium such as film remain proportional to the angular velocity of the deflector to achieve uniform power density incident on the film during the scan. The scan linearity performance of the scan lens 18 of the first embodiment is shown in the plots of FIG. 22 for scanning by both the holographic grating and the galvo mirror. The vertical axis is the departure from linearity in mm, while the horizontal axis measures degrees of rotation.

Figure 23:
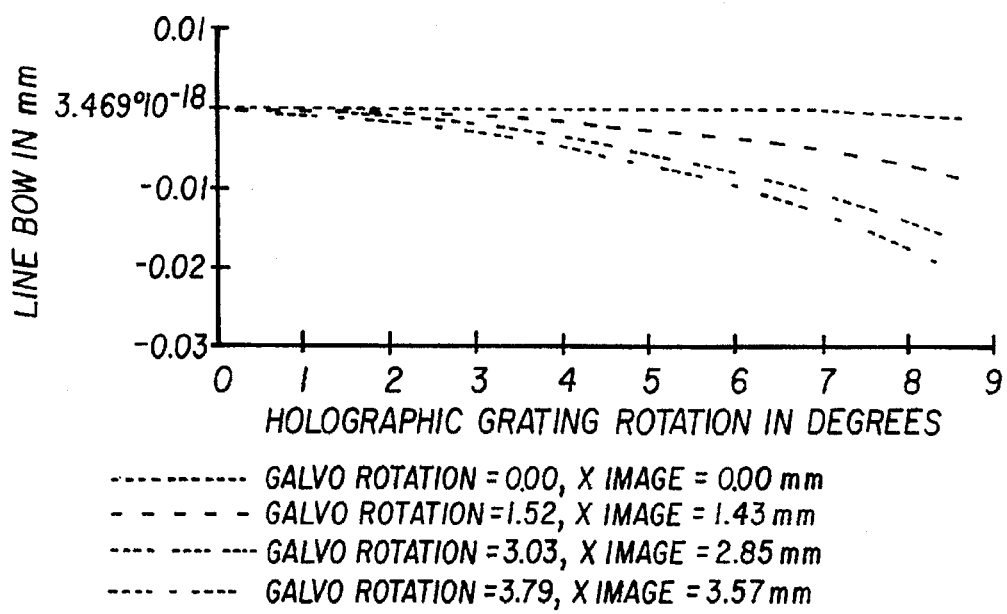
FIG. 23 illustrates line bow characteristics of the first preferred embodiment of the present invention.

2. Holographic grating scanners introduce line bow into the scan line. It is important to keep this line bow minimized to an acceptable level. This problem is more complicated in a scanner with two deflectors because the distortion of the scan lens, which controls the scan linearity described in item 2, causes differing amounts of line bow at each page location. The distortion of the scan lens must be carefully tailored to provide both acceptable scan linearity and acceptable line bow. Line bow characteristics for the scan lens 18 of the first preferred embodiment are shown in FIG. 23.

Figure 24:
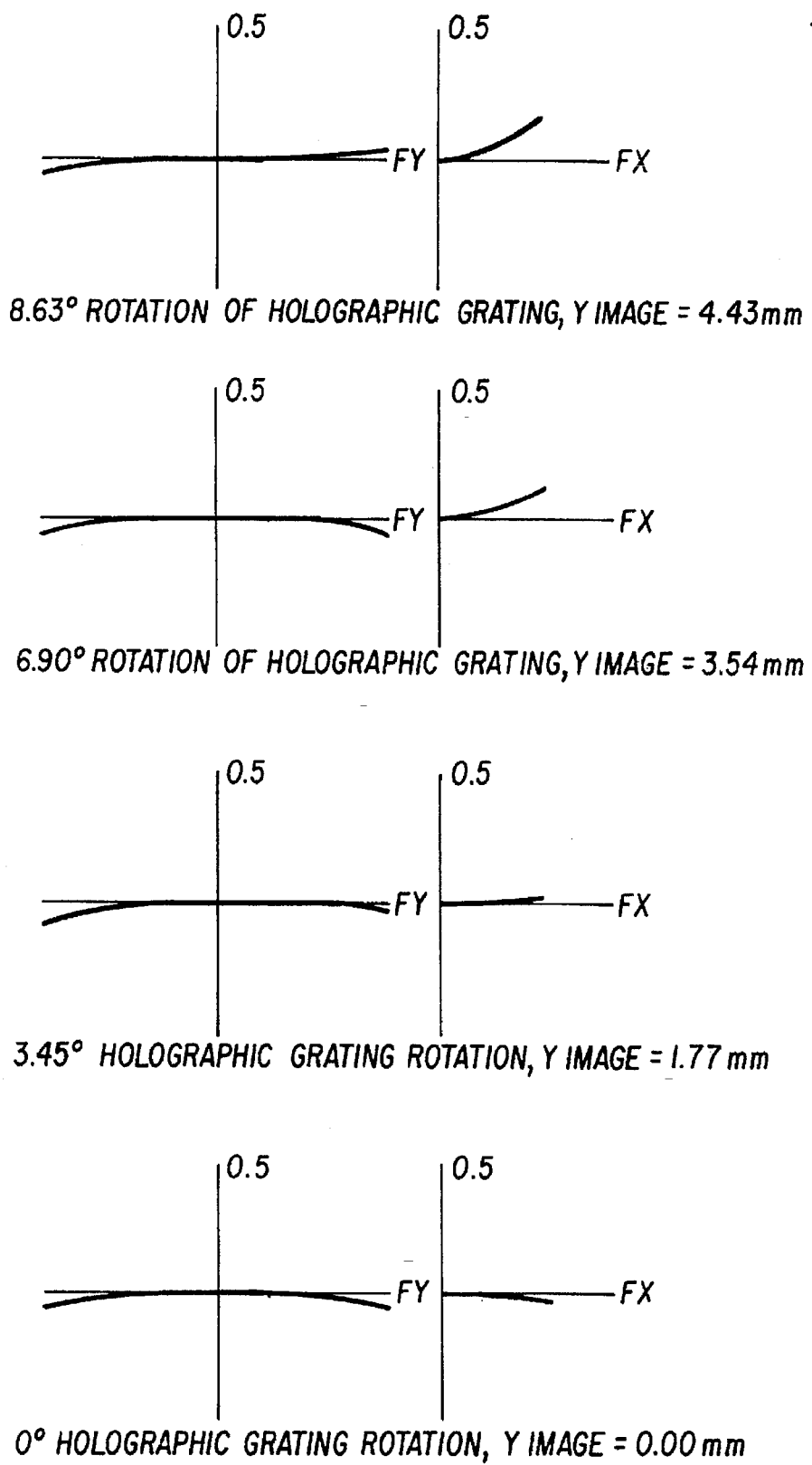
FIG. 24 shows the OPD correction as a function of holographic grating rotation at a zero galvo mirror orientation.
Figure 25:
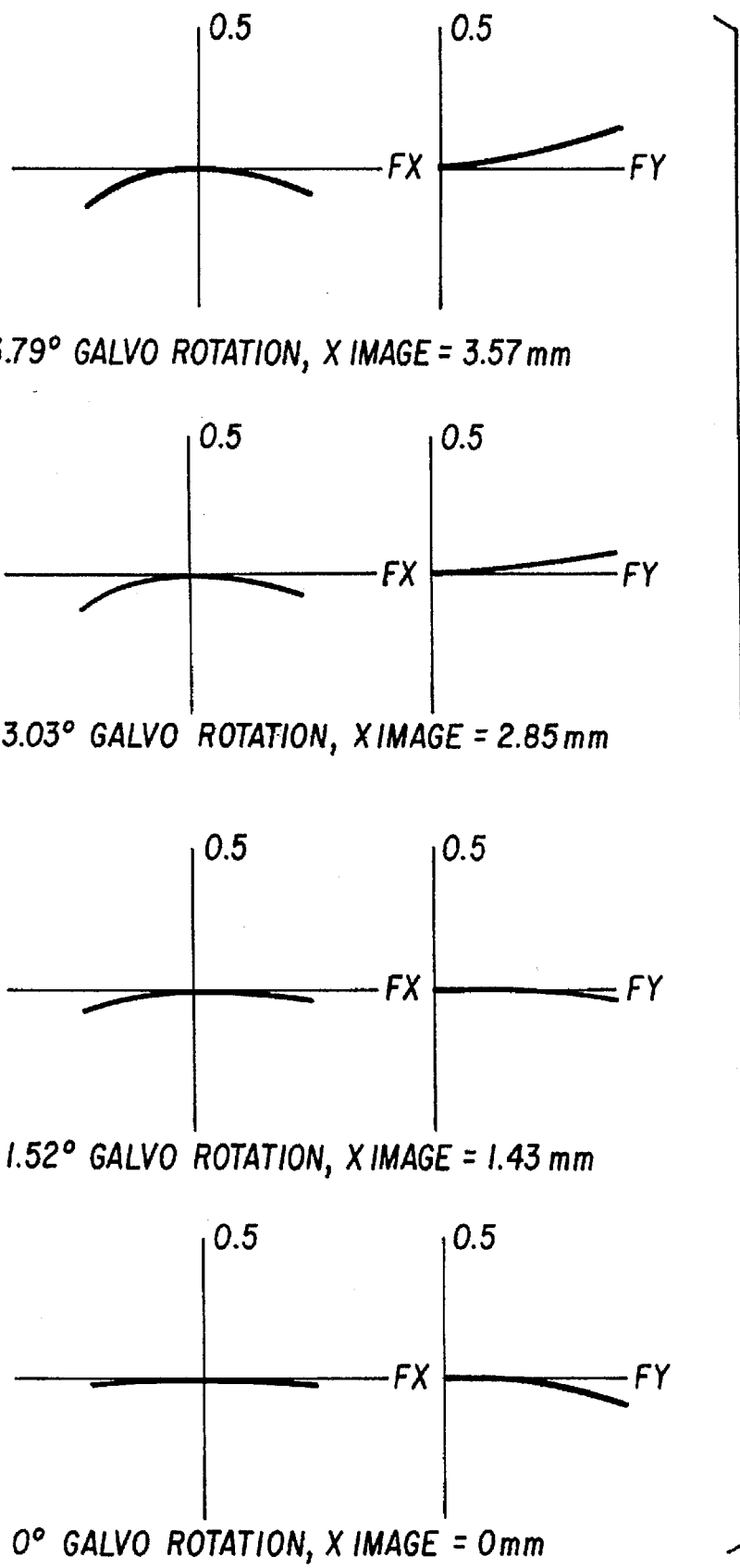
FIG. 25 shows the OPD correction as a function of galvo mirror rotation at zero holographic grating orientation.

3. The correction of the point-to-point aberrations must be small enough that the size of the spot produced by the laser does not grow appreciably over the film during scanning. These aberrations are generally measured in OPD (Optical Path Difference) terms for scanning systems. For scanners using two deflectors, it is important that the OPD remains well corrected during deflection of the beam by either scanner. FIGS. 24 and 25 show the OPD correction as a function of holographic grating rotation and galvo mirror rotation for the scan lens 18 of the first preferred embodiment. Specifically, FIG. 24 shows OPD for zero galvo mirror rotation while FIG. 25 shows OPD for zero holographic grating rotation.

Figure 26:
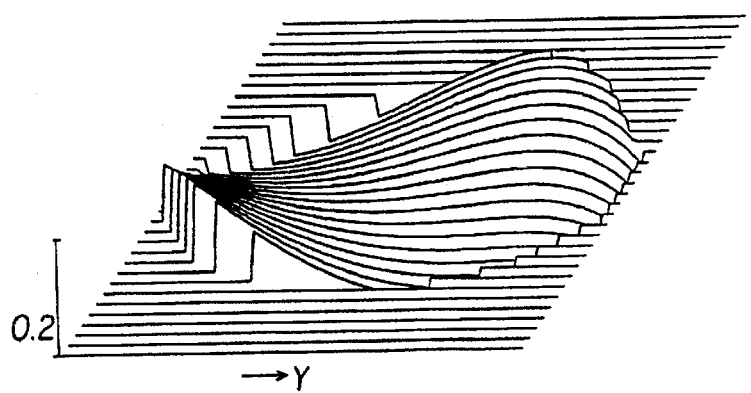
FIG. 26 shows the optical performance of the optical system of the first preferred embodiment in the corner of the largest format.

Finally, FIG. 26 shows the optical performance of the optical system in the corner of the largest format. FIG. 26 is a wavefront contour map for a galvo rotation of 7.55°, holographic grating rotation of 3.32° and X image=3.11 mm, Y image=3.88 mm. This is the maximum field coverage of the scan lens 18. As we can see from the plot, peak-to-valley (P-V) OPD is 0.2023 waves, which corresponds to the RMS (root mean square) OPD of 0.03836 waves.

Although the above analysis was performed for the optical scan system incorporating the lens system (18) of the first embodiment, the analysis results are also representative of what is possible to achieve with the other similar scan lenses.

Figure 10:
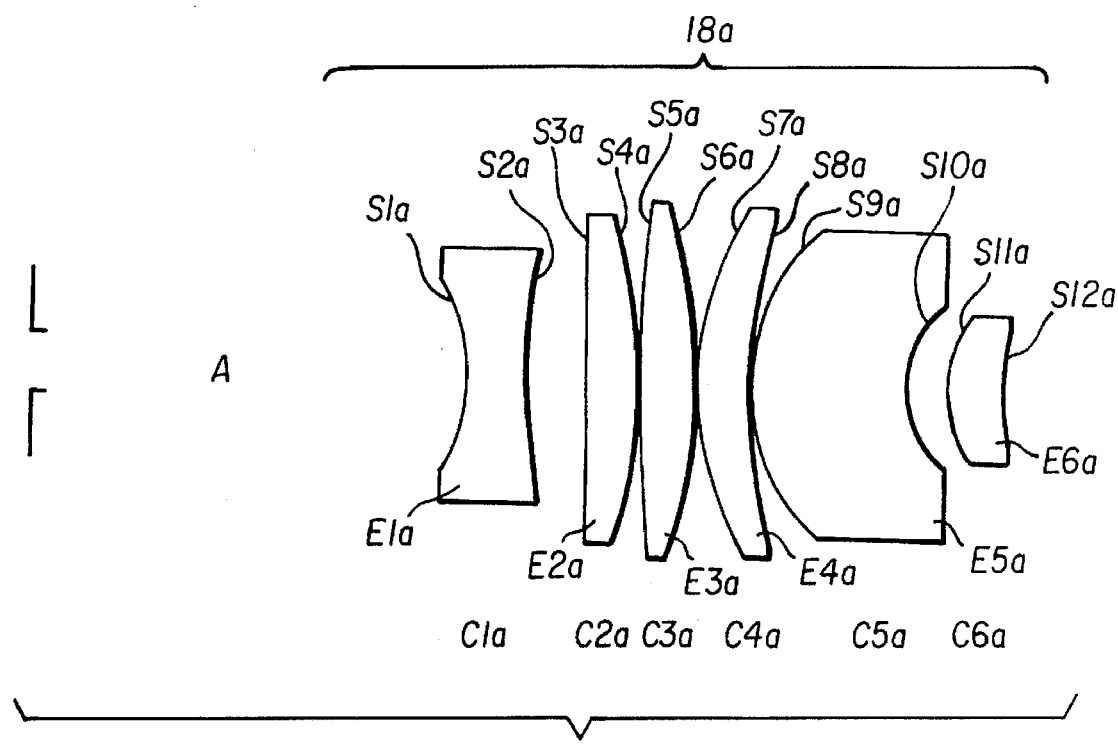
FIG. 10 is the schematic of the side view of the lens system 18a of the second embodiment.

The second preferred embodiment of the scan lens is a lens system 18a. It is illustrated in FIG. 10. It's parameters are provided in Table 3.

This lens system has a focal length of 27 mm, is capable of working in 42X as well as in 48X mode and has F-numbers F/2.96–F/3.66.

The lens system 18a includes 6 lens components C1a–C6a.

The first lens component C1a is a negative power lens component. It corresponds to a biconcave lens element E1a. The front surface S1 of the lens component C1a is concave and faces the object side. The rear surface S2a of the lens component C1a is also concave.

The second optical component C2a is a positive power lens element E2a. The lens element E2a is a meniscus lens element. It has a front concave surface S3a and a rear (or image side) convex surface S4a.

The third optical component C3a is a positive power lens element E3a. The lens element E3a is biconvex. It has a front convex surface S5a and a rear convex surface S6a.

The fourth optical component C4a is a positive power lens element E4a. The lens element E4a is a meniscus lens element. It has a front convex surface S7a and a rear (or image side) concave surface S8a.

The fifth optical component C5a is a positive power lens element E5a. The lens element E5a is a meniscus lens element. It has a front convex surface S9a and a rear (or image side) concave surface S10a.

The sixth optical component C6a is a positive power lens element E6a. The lens element E6a is a meniscus lens element. It has a front convex surface S11a and a rear (or image side) concave surface S12a.

EXAMPLE 2

TABLE 3

| SURF. | CLEAR APER. | AXIAL BEAM | RADIUS | THICK-NESS | INDEX | V-NUMBER | SPECIAL NOTES |
|---|---|---|---|---|---|---|---|
|  | 9.14 | 9.14 | DIAPHRAGM | A |  |  |  |
| 1 | 29.14 | 9.14 | −29.7505 | 10.231 | 1.517 | 64.2 | BK-7 |
| 2 | 38.31 | 10.26 | 111.735 | 9.297 |  |  |  |
| 3 | 47.76 | 12.17 | −3043.89 | 8.200 | 1.805 | 25.4 | SF-6 |
| 4 | 50.44 | 13.10 | −81.1064 | 0.150 |  |  |  |
| 5 | 53.86 | 13.15 | 242.253 | 9.000 | 1.805 | 25.4 | SF-6 |
| 6 | 54.58 | 13.33 | −90.6475 | 0.200 |  |  |  |
| 7 | 53.33 | 13.26 | 51.9944 | 8.500 | 1.805 | 25.4 | SF-6 |
| 8 | 50.66 | 11.95 | 92.1109 | 0.150 |  |  |  |
| 9 | 46.91 | 11.86 | 32.3631 | 24.858 | 1.805 | 25.4 | SF-6 |
| 10 | 23.53 | 5.33 | 15.3355 | 6.543 |  |  |  |
| 11 | 21.55 | 4.07 | 17.5232 | 9.000 | 1.805 | 25.4 | SF-6 |
| 12 | 16.17 | 2.17 | 40.7438 |  |  |  |  |

TWO ENTRANCE PUPILS

1) $\dfrac{A}{EFL} = 2.6$   2) $\dfrac{A}{EFL} = 0.89$

NOTES:
1. F/#= 2.96–3.66
   EF = 27.00
   FORMATS:  48× MODE: 7.874 × 6.187 (HOE × GALVO)
             42× MODE: 8.738 × 6.865 (HOE × GALVO)
2. CONFIGURATION INFORMATION

| EF | BE | FF | BEST FOCUS | A |
|---|---|---|---|---|
| 27.00 | 6.34 | 3.47 | −.0015 | 70.000 |
| 27.00 | 6.34 | 3.47 | −.0015 | 70.000 |
| 27.00 | 6.34 | 3.47 | −.0015 | 24.000 |
| 27.00 | 6.34 | 3.47 | −.0015 | 24.000 |

TABLE 3-continued

| EF | N.P. LOC. | N.P. DIAM. | X.P. LOC. | X.P. DIAM. |
|---|---|---|---|---|
| 27.00 | −70.00 | 9.14 | 17.30 | 3.71 |
| 27.00 | −70.00 | 7.37 | 17.30 | 2.99 |
| 27.00 | −24.00 | 9.14 | 41.86 | 12.02 |
| 27.00 | −24.00 | 7.37 | 41.86 | 9.69 |

| EF | LENS LENGTH | STOP DIAM. | REL. APER. | SEMI FIELD | SEMI DIAG. | DESCRIPTION |
|---|---|---|---|---|---|---|
| 27.00 | 86.129 | 9.14 | 2.96 | 8.41 DEG | 3.93 | 48× - HOE @ EN PUPIL |
| 27.00 | 86.129 | 7.37 | 3.66 | 9.34 DEG | 4.36 | 42× - HOE @ EN PUPIL |
| 27.00 | 86.129 | 9.14 | 2.96 | 6.62 DEG | 3.10 | 48× - GALVO @ EN PUPIL |
| 27.00 | 86.129 | 7.37 | 3.66 | 7.34 DEG | 3.44 | 42× GALVO EN PUPIL |

3. PERFORMANCE

48×- HOE @ EN PUPIL

| ANGLE | 1.6340 | 3.2681 | 4.9027 | 6.5379 | 8.1741 | 8.4079 |
|---|---|---|---|---|---|---|
| DESIRED RAY HT. | .7656 | 1.5311 | 2.2966 | 3.0621 | 3.8277 | 3.9370 |
| ACTUAL RAY HT. | .7698 | 1.5380 | 2.3032 | 3.0642 | 3.8205 | 3.9281 |
| DIFFERENCE | −.0042 | −.0069 | −.0066 | −.0021 | +.0072 | +.0089 |
| RMS OPD | .0073 | .0044 | .0009 | .0033 | .0038 | .0040 |

42× - HOE @ EN PUPIL

| ANGLE | 1.6340 | 3.2681 | 4.9027 | 6.5379 | 8.1741 | 9.3401 |
|---|---|---|---|---|---|---|
| DESIRED RAY HT. | .7648 | 1.5296 | 2.2944 | 3.0592 | 3.8241 | 4.3688 |
| ACTUAL RAY HT. | .7698 | 1.5380 | 2.3032 | 3.0642 | 3.8205 | 4.3561 |
| DIFFERENCE | −.0050 | −.0084 | −.0088 | −.0050 | +.0036 | +.0127 |
| RMS OPD | .0050 | .0031 | .0005 | .0026 | .0036 | .0069 |

48× - GALVO EN PUPIL (EQUIV. FOCAL LENGTH = 26.895)

| ANGLE | 1.1010 | 2.2021 | 3.3031 | 4.4041 | 5.5052 | 6.6062 |
|---|---|---|---|---|---|---|
| F-TH COMPLIANCE | −.0021 | −.0035 | −.0038 | −.0028 | +.0001 | +.0052 |
| RMS OPD | .0074 | .0050 | .0034 | .0051 | .0063 | .0048 |

42× - GALVO @ EN PUPIL (EQUIV. FOCAL LENGTH = 26.873)

| ANGLE | 1.2231 | 2.4462 | 3.6693 | 4.8924 | 6.1155 | 7.3387 |
|---|---|---|---|---|---|---|
| F-TH COMPLIANCE | −.0027 | −.0047 | −.0052 | −.0038 | +.0002 | +.0070 |
| RMS OPD | .0049 | .0030 | .0023 | .0036 | .0036 | .0047 |

Figure 11:
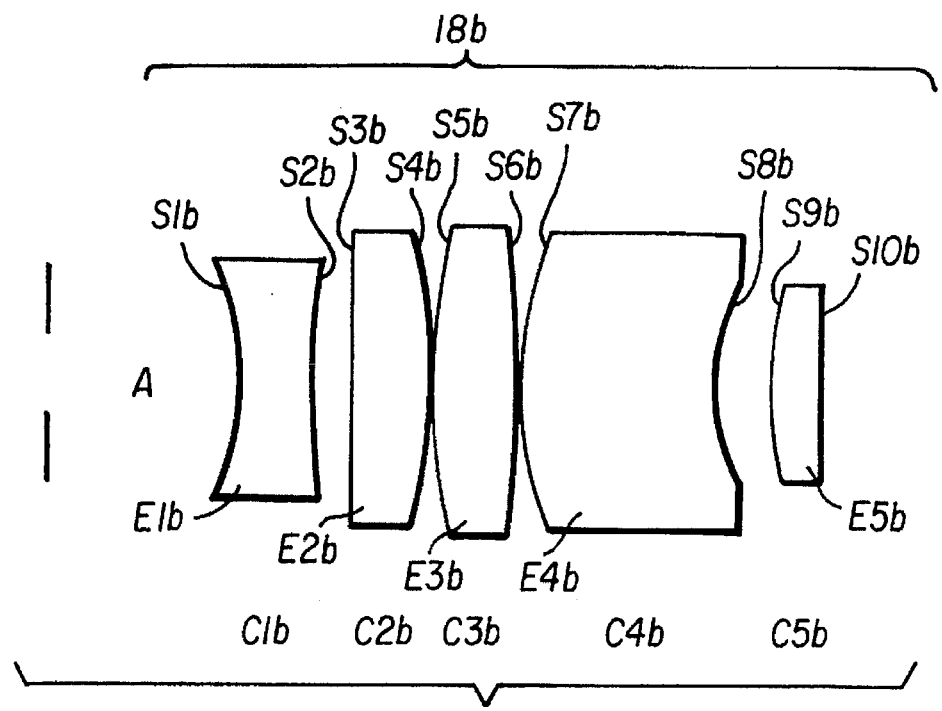
FIG. 11 is the schematic of the side view of the lens system 18b of the third embodiment.

The third preferred embodiment of the scan lens is a lens system 18b. It is illustrated in FIG. 11. It's parameters are provided in Table 4.

This lens system has a focal length of 53.59 mm, has a semifield angle 8.46–6.61 degrees and is designed for 24X magnification. It has an F-numbers F/5.87.

The lens system 18b includes 5 lens components C1b–C5b.

The first lens component C1b is a negative power lens component. It corresponds to a biconcave lens element E1b. The front surface S1b of the lens component C1b is concave and faces the object side. The rear surface S2b of the lens component C1b is also concave.

The second optical component C2b is a positive power lens element E2b. The lens element E2b is a meniscus lens element. It has a front concave surface S3b and a rear (or image side) convex surface S4b.

The third optical component C3b is a positive power lens element E3b. The lens element E3b is biconvex. It has a front convex surface S5b and a rear convex surface S6b.

The fourth optical component C4b is a positive power lens element E4b. The lens element E4b is a meniscus lens element. It has a front convex surface S7b and a rear (or image side) concave surface S8b.

The fifth optical component C5b is a positive power lens element E5b. The lens element E5b is a meniscus lens element. It has a front convex surface S9b and a rear (or image side) concave surface S10b.

EXAMPLE 3

TABLE 4

| SURF. | CLEAR APER. | AXIAL BEAM | RADIUS | THICK-NESS | INDEX | V-NUMBER | SPECIAL NOTES |
|---|---|---|---|---|---|---|---|
|  | 9.14 | 9.14 | DIAPHRAGM | A |  |  |  |
| 1 | 28.83 | 9.14 | −31.9220 | 9.282 | 1.517 | 64.2 | BK-7 |
| 2 | 36.26 | 10.09 | 124.409 | 5.130 |  |  |  |
| 3 | 40.34 | 11.05 | PLANO | 10.025 | 1.785 | 26.1 | SF-56 |
| 4 | 43.68 | 12.09 | −61.8929 | 0.256 |  |  |  |
| 5 | 46.66 | 12.12 | 86.1752 | 10.969 | 1.785 | 26.1 | SF-56 |
| 6 | 46.47 | 11.69 | −164.430 | 0.160 |  |  |  |
| 7 | 44.39 | 11.61 | 47.4251 | 24.959 | 1.785 | 26.1 | SF-56 |
| 8 | 29.74 | 7.15 | 26.1336 | 7.188 |  |  |  |
| 9 | 29.44 | 6.41 | 50.1784 | 6.125 | 1.517 | 64.2 | BK-7 |
| 10 | 28.46 | 5.73 | PLANO |  |  |  |  |

TWO ENTRANCE PUPILS

1) $\dfrac{A}{EFL} = 1.31$   2) $\dfrac{A}{EFL} = 0.45$

NOTES:
1. F/# = 5.87
   EF = 53.59
   FORMAT IS 12.358 × 15.750 (GALVO × HOE)
2. CONFIGURATION INFORMATION

| EF | BF | FF | BEST FOCUS | A |
|---|---|---|---|---|
| 53.59 | 33.52 | 32.39 | −.007 | 70.000 |
| 53.59 | 33.52 | 32.39 | −.007 | 24.000 |

| EF | N.P. LOC. | N.P. DIAM. | X.P. LOC. | X.P. DIAM. |
|---|---|---|---|---|
| 53.59 | −70.00 | 9.14 | 109.88 | 13.02 |
| 53.59 | −24.00 | 9.14 | −308.93 | 53.38 |

| EF | LENS LENGTH | STOP DIAM. | REL. APER. | SEMI FIELD | SEMI DIAG. | DESCRIPTION |
|---|---|---|---|---|---|---|
| 53.59 | 74.094 | 9.14 | 5.87 | 8.42 DEG | 7.875 | HOE & ENTRANCE PUPIL |
| 53.59 | 74.094 | 9.14 | 5.87 | 6.61 DEG | 6.179 | GALVO & ENTRANCE PUPIL |

3. PERFORMANCE
   HOE @ ENTRANCE PUPIL

| ANGLE (DEG.) | .5446 | 2.1786 | 3.8129 | 5.4477 | 7.0832 | 8.4169 |
|---|---|---|---|---|---|---|
| DESIRED RAY HT. | .5105 | 2.0396 | 3.5687 | 5.0978 | 6.6269 | 7.8740 |
| ACTUAL RAY HT. | .5094 | 2.0378 | 3.5662 | 5.0950 | 6.6254 | 7.8754 |
| DIFFERENCE | +.0011 | +.0018 | +.0025 | +.0028 | +.0015 | −.0014 |
| RMS OPD | .0079 | .0048 | .0017 | .0039 | .0060 | .0072 |

GALVO @ ENTRANCE PUPIL (EQUIV. FOCAL LENGTH = 53.588)

| ANGLE | 1.1010 | 2.2021 | 3.3031 | 4.4041 | 5.5052 | 6.6062 |
|---|---|---|---|---|---|---|
| F-TH COMPLIANCE | −.0001 | −.0002 | −.0001 | +.0001 | +.0002 | −.0001 |
| RMS OPD | .0072 | .0048 | .0021 | .0025 | .0040 | .0053 |

Figure 12:
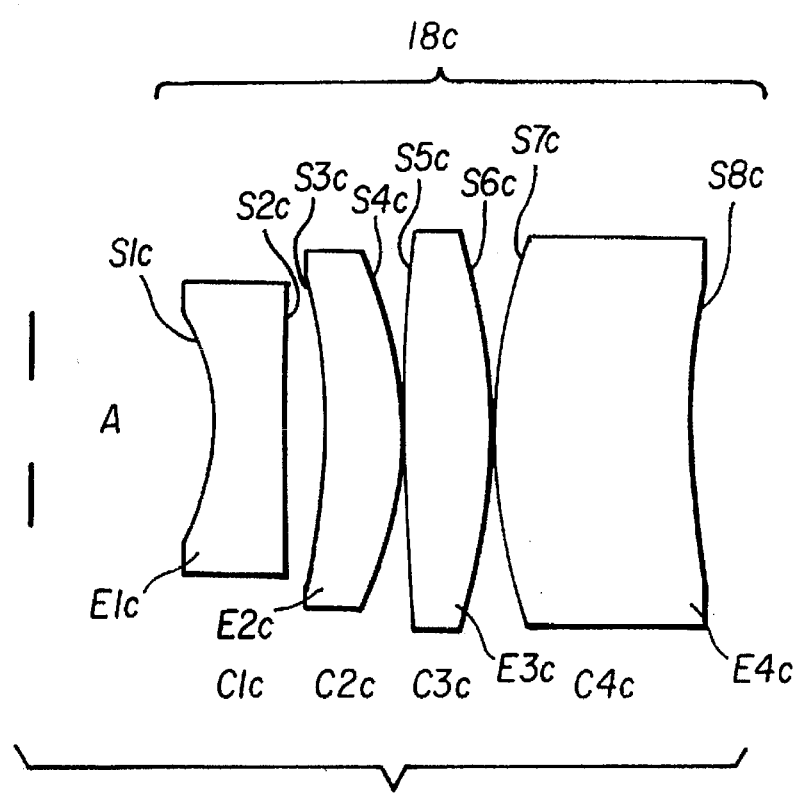
FIG. 12 is the schematic of the side view of the lens system 18c of the fourth embodiment.

The fourth preferred embodiment of the scan lens is a lens system 18c. It is illustrated in FIG. 12. It's parameters are provided in Table 5.

This lens system has a focal length of 53.79 mm, is designed to provide 24X magnification and has F-number F/5.87.

The lens system 18c comprises only four lens components C1c–C4c.

The first lens component C1c is a negative power lens component. It corresponds to a biconcave lens element E1c.

The front surface S1c of the lens component C1c is concave and faces the object side. The rear surface S2c of the lens component C1c is also concave.

The second optical component C2c is a positive power lens element E2c. The lens element E2c is a meniscus lens element. It has a front concave surface S3c and a rear (or image side) convex surface S4c.

The third optical component C3c is a positive power lens element E3c. The lens element E3c is biconvex. It has a front convex surface S5c and a rear convex surface S6c.

The fourth optical component C4c is a positive power lens element E4c. The lens element E4a is a meniscus lens element. It has a front convex surface S7c and a rear (or image side) concave surface S8c.

EXAMPLE 4

TABLE 5

| SURF. | CLEAR APER. | AXIAL BEAM | RADIUS | THICK-NESS | INDEX | V-NUMBER | SPECIAL NOTES |
|---|---|---|---|---|---|---|---|
|   | 9.17 | 9.17 | DIAPHRAGM | A |   |   |   |
| 1 | 28.65 | 9.17 | −26.7829 | 9.134 | 1.501 | 56.4 | K-10 |
| 2 | 36.75 | 10.27 | 698.300 | 5.034 |   |   |   |
| 3 | 38.96 | 11.14 | −75.4793 | 10.140 | 1.805 | 25.4 | SF-6 |
| 4 | 44.54 | 12.79 | −47.6110 | 0.185 |   |   |   |
| 5 | 48.39 | 12.85 | 282.120 | 11.083 | 1.805 | 25.4 | SF-6 |
| 6 | 49.71 | 13.12 | −74.9060 | 0.175 |   |   |   |
| 7 | 48.40 | 13.05 | 70.9840 | 25.042 | 1.805 | 25.4 | SF-6 |
| 8 | 39.37 | 9.71 | 109.834 |   |   |   |   |

TWO ENTRANCE PUPILS

1) $\dfrac{A}{EFL} = 1.31$    2) $\dfrac{A}{EFL} = 0.45$

NOTES:
1. F/#= 5.87
   EF = 53.79
   FORMATS 12.358 × 15.750 (GALVO × HOE)
2. CONFIGURATION INFORMATION

| EF | BF | FF | BEST FOCUS | A |
|---|---|---|---|---|
| 53.79 | 56.90 | 25.79 | −.0055 | 70.000 |
| 53.79 | 56.90 | 25.79 | −.0055 | 24.000 |

| EF | N.P. LOC. | N.P. DIAM. | X.P. LOC. | X.P. DIAM. |
|---|---|---|---|---|
| 53.79 | −70.00 | 9.17 | 122.34 | 11.16 |
| 53.79 | −24.00 | 9.17 | 1561.62 | 275.89 |

| EF | LENS LENGTH | STOP DIAM. | REL. APER. | SEMI FIELD | SEMI DIAG. | DESCRIPTION |
|---|---|---|---|---|---|---|
| 53.59 | 60.793 | 9.17 | 5.87 | 8.42 DEG | 7.875 | HOE @ ENTRANCE PUPIL |
| 53.79 | 60.793 | 9.17 | 5.87 | 6.61 DEG | 6.179 | GALVO @ ENTRANCE PUPIL |

3. PERFORMANCE
   HOE @ ENTRANCE PUPIL

| ANGLE (DEG.) | .5446 | 2.1786 | 3.8129 | 5.4477 | 7.0832 | 8.4169 |
|---|---|---|---|---|---|---|
| DESIRED RAY HT. | .5105 | 2.0396 | 3.5687 | 5.0978 | 6.6269 | 7.8740 |
| ACTUAL RAY HT. | .5113 | 2.0448 | 3.5765 | 5.1048 | 6.6277 | 7.8630 |
| DIFFERENCE | −.0008 | −.0052 | −.0078 | −.0070 | −.0008 | +.0110 |
| RMS OPD | .0070 | .0074 | .0073 | .0011 | .0141 | .0149 |

GALVO @ ENTRANCE PUPIL (EQUIV. FOCAL LENGTH = 53.686)

| ANGLE (DEG.) | 1.1010 | 2.2021 | 3.3031 | 4.4041 | 5.5052 | 6.6062 |
|---|---|---|---|---|---|---|
| F-TH COMPLIANCE | −.0020 | −.0035 | −.0041 | −.0031 | −.0001 | +.0057 |
| RMS OPD | .0071 | .0074 | .0072 | .0079 | .0111 | .0143 |

Figure 13:
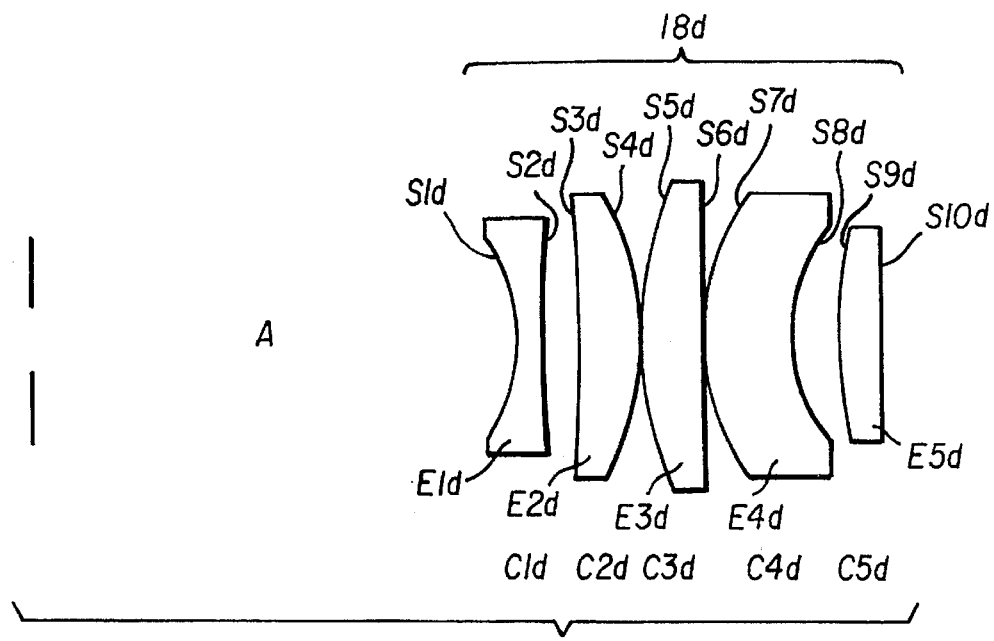
FIG. 13 is the schematic of the side view of the lens system 18d of the fifth embodiment.

The fifth preferred embodiment of the scan lens is a lens system 18d. It is illustrated in FIG. 13. Its parameters are provided in Table 6.

This lens system has a focal length of 53.55 mm, is designed to provide 24X magnification and has an F-number F/5.86.

The lens system 18d includes 5 lens components C1d–C5d.

The first lens component C1d is a negative power lens component. It corresponds to a biconcave lens element E1d. The front surface S1d of the lens component C1d is concave and faces the object side. The rear surface S2d of the lens component C1d is also concave.

The second optical component C2a is a positive power lens element E2d. The lens element E2d is a meniscus lens element. It has a front concave surface S3d and a rear (or image side) convex surface S4d.

The third optical component C3d is a positive power lens element E3a. The lens element E3d is a meniscus lens element. It has a front convex surface S5d and a rear slightly convex surface S6d.

The fourth optical component C4d is a positive power lens element E4d. The lens element E4d is a meniscus lens element. It has a front convex surface S7d and a rear (or image side) concave surface S8d.

The fifth optical component C5a is a positive power lens element E5a. The lens element E5a is a biconvex lens element. It has a front convex surface S9a and a rear (or image side) convex surface S10a.

EXAMPLE 5

TABLE 6

| SURF. | CLEAR APER. | AXIAL BEAM | RADIUS | THICKNESS | INDEX | V-NUMBER | SPECIAL NOTES |
|---|---|---|---|---|---|---|---|
|   | 9.14 | 9.14 | DIAPHRAGM | A |   |   |   |
| 1 | 28.60 | 9.14 | −26.4006 | 4.000 | 1.517 | 64.2 | BK-7 |
| 2 | 33.96 | 9.66 | 258.050 | 5.019 |   |   |   |
| 3 | 37.88 | 10.65 | −204.615 | 9.000 | 1.805 | 25.4 | SFL-6 |
| 4 | 40.86 | 11.81 | −41.9665 | 0.230 |   |   |   |
| 5 | 44.09 | 11.82 | 53.7493 | 9.000 | 1.805 | 25.4 | SFL-6 |
| 6 | 43.07 | 11.04 | 1117.65 | 0.208 |   |   |   |
| 7 | 40.62 | 10.95 | 35.5605 | 12.000 | 1.847 | 23.8 | SFL-57 |
| 8 | 31.20 | 8.25 | 23.3570 | 7.239 |   |   |   |
| 9 | 30.87 | 7.46 | 72.3748 | 6.126 | 1.517 | 64.2 | BK-7 |
| 10 | 29.89 | 6.79 | −1117.65 |   |   |   |   |

NOTES:
1. F/# = 5.86
   EF = 53.55
   FORMAT IS 12.358 × 15.750 (GALVO × HOE)

$$\frac{A_1}{EFL} = 1.31; \quad \frac{A_2}{EFL} = 0.45;$$

WHERE $A_1$ IS THE DISTANCE TO THE HOLOGRAPHIC DEFLECTOR AND $A_2$ IS THE DISTANCE TO A GALVO DEFLECTOR.

2. CONFIGURATION INFORMATION

| EF | BF | FF | BEST FOCUS | A |
|---|---|---|---|---|
| 53.55 | 39.66 | 36.32 | −.011 | 70.000 |
| 53.55 | 39.66 | 36.32 | −.011 | 24.000 |

| EF | N.P. LOC. | N.P. DIAM. | X.P. LOC. | X.P. DIAM. |
|---|---|---|---|---|
| 53.55 | −70.00 | 9.14 | 124.80 | 14.52 |
| 53.55 | −24.00 | 9.14 | 193.12 | 39.71 |

| EF | LENS LENGTH | STOP DIAM. | REL. APER. | SEMI FIELD | SEMI DIAG. | DESCRIPTION |
|---|---|---|---|---|---|---|
| 53.55 | 52.822 | 9.14 | 5.86 | 8.42 DEG | 7.86 | HOE @ ENTRANCE PUPIL |
| 53.55 | 52.822 | 9.14 | 5.86 | 6.61 DEG | 6.18 | GALVO @ ENTRANCE PUPIL |

3. PERFORMANCE
   HOE @ ENTRANCE PUPIL

| ANGLE (DEG.) | 0.5446 | 2.1786 | 3.8129 | 5.4477 | 7.0832 | 8.4169 |
|---|---|---|---|---|---|---|
| DESIRED RAY HT. | 0.5105 | 2.0396 | 3.5687 | 5.0978 | 6.6269 | 7.8740 |
| ACTUAL RAY HT. | 0.5091 | 2.0363 | 3.5635 | 5.0914 | 6.6220 | 7.87?? |
| DIFFERENCE | 0.0015 | 0.0033 | 0.0052 | 0.0064 | 0.0048 | −0.0002 |

TABLE 6-continued

| RMS OPD | 0.0098 | 0.0067 | 0.0151 | 0.0178 | 0.0096 | 0.0173 |
|---|---|---|---|---|---|---|
| GALVO @ ENTRANCE PUPIL (EQUIV. FOCAL LENGTH = 53.557) | | | | | | |
| ANGLE | 1.1010 | 2.2021 | 3.3031 | 4.4041 | 5.5052 | 6.6062 |
| DESIRED RAY HT. | 1.0292 | 2.0584 | 3.0876 | 4.1167 | 5.1460 | 6.1751 |
| ACTUAL RAY HT. | 1.0290 | 2.0581 | 3.0872 | 4.1164 | 5.1459 | 6.1757 |
| DIFFERENCE | 0.0002 | 0.0003 | 0.0004 | 0.0004 | 0.0001 | −0.0006 |
| RMS OPD | 0.0092 | 0.0067 | 0.0049 | 0.0062 | 0.0067 | 0.0031 |

4. THE DISTANCE(S) FROM THE ENTRANCE PUPIL(S) TO THE IMAGE PLANE OF THIS DESIGN MATCHES THE CORRESPONDING DISTANCE(S) OF EXAMPLE 2 IN Table 3.

Figure 14:
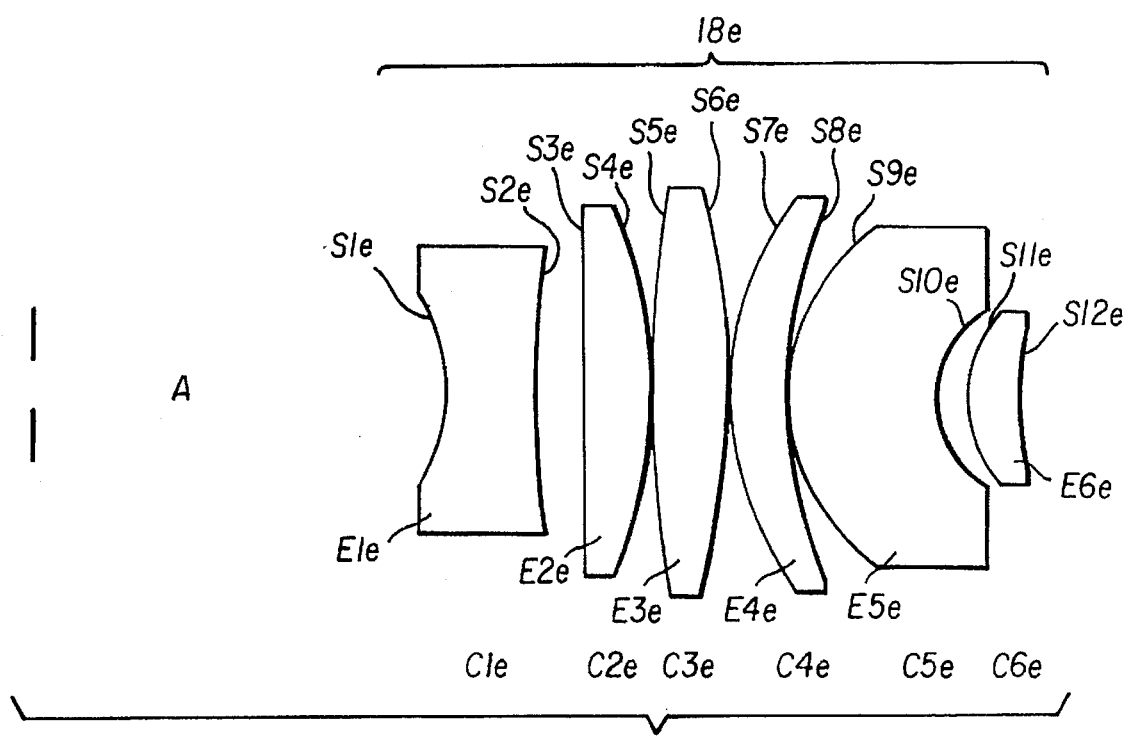
FIG. 14 is the schematic of the side view of the lens system 18e of the sixth embodiment.

The sixth preferred embodiment of the scan lens is a lens system 18e. It is illustrated in FIG. 14. It's parameters are provided in Table 7.

This lens system has a focal length of 27.17 mm, is capable of working in 42X as well as in 48X mode and has an F-number F/2.84.

The lens system 18e includes 6 lens components C1e–C6e.

The first lens component C1e is a negative power lens component. It corresponds to a biconcave lens element E1e. The front surface S1e of the lens component C1e is concave and faces the object side. The rear surface S2e of the lens component C1e is also concave.

The second optical component C2e is a positive power lens element E2e. The lens element E2e is a meniscus lens element. It has a front concave surface S3e and a rear (or image side) convex surface S4e.

The third optical component C3e is a positive power lens element E3e. The lens element E3e is biconvex. It has a front convex surface S5e and a rear convex surface S6e.

The fourth optical component C4e is a positive power lens element E4e. The lens element E4e is a meniscus lens element. It has a front convex surface S7e and a rear (or image side) concave surface S8e.

The fifth optical component C5e is a positive power lens element E5e. The lens element E5e is a meniscus lens element. It has a front convex surface S9e and a rear (or image side) concave surface S10e.

The sixth optical component C6e is a positive power lens element E6e. The lens element E6e is a meniscus lens element. It has a front convex surface S11e and a rear (or image side) concave surface S12e.

EXAMPLE 6

TABLE 7

| SURF. | CLEAR APER. (3) | AXIAL BEAM | RADIUS | THICK-THICKNESS | INDEX | V-NUMBER |
|---|---|---|---|---|---|---|
| | 9.57 | 9.57 | DIAPHRAGM | A | | |
| 1 | 31.90 | 9.57 | −29.0230 | 15.000 | 1.517 | 64.2 |
| 2 | 47.16 | 11.33 | 135.811 | 8.256 | | |
| 3 | 56.47 | 13.08 | −1912.42 | 11.500 | 1.834 | 37.2 |
| 4 | 60.37 | 14.43 | −74.7421 | 0.150 | | |
| 5 | 65.87 | 14.47 | 216.850 | 12.518 | 1.834 | 37.2 |
| 6 | 66.80 | 14.50 | −122.465 | 0.200 | | |
| 7 | 64.41 | 14.41 | 53.0957 | 9.500 | 1.834 | 37.2 |
| 8 | 60.94 | 12.79 | 78.6332 | 0.150 | | |
| 9 | 55.71 | 12.70 | 34.4449 | 24.771 | 1.834 | 37.2 |
| 10 | 29.58 | 6.08 | 17.6500 | 4.698 | | |
| 11 | 28.58 | 5.13 | 21.8514 | 8.300 | 1.834 | 37.2 |
| 12 | 24.32 | 3.33 | 58.2268 | | | |

NOTES:
1. F/# = 2.84
   EF = 27.17
   FORMATS: 1ST FORMAT OF 48X MODE: 7.756 × 6.244 (HOE × GALVO)
   2ND FORMAT OF 48X MODE: 6.244 × 7.756 (HOE × GALVO)
   1ST FORMAT OF 42X MODE: 8.866 × 7.136 (HOE × GALVO)
   2ND FORMAT OF 42X MODE: 7.136 × 8.866 (HOE × GALVO)
2. CONFIGURATION INFORMATION

| CFG | BF | FF | BEST FOCUS | A |
|---|---|---|---|---|
| 1 | 9.3475 | 1.76 | −.0026 | 70.000 |
| 2 | 9.3475 | 1.76 | −.0026 | 70.000 |
| 3 | 9.3475 | 1.76 | −.0026 | 24.000 |
| 4 | 9.3475 | 1.76 | −.0026 | 24.000 |

TABLE 7-continued

| CFG | N.P. LOC. | N.P. DIAM. | X.P. LOC. | X.P. DIAM. |
|---|---|---|---|---|
| 1 | −70.00 | 9.57 | 20.17 | 3.81 |
| 2 | −70.00 | 9.57 | 20.17 | 3.81 |
| 3 | −24.00 | 9.57 | 42.55 | 11.69 |
| 4 | −24.00 | 9.57 | 42.55 | 11.69 |

| CFG | LENS LENGTH | STOP DIAM. | REL. APER. | SEMI FIELD* |
|---|---|---|---|---|
| 1 | 95.043 | 9.57 | 2.84 | 8.231° |
| 2 | 95.043 | 9.57 | 2.84 | 9.407° |
| 3 | 95.043 | 9.57 | 2.84 | 8.231° |
| 4 | 95.043 | 9.57 | 2.84 | 9.407° |

| CFG | EDGE OF SCAN | MODE | FORMAT | DEFLECTOR AT ENTRANCE PUPIL |
|---|---|---|---|---|
| 1 | 3.887 | 48X | 1ST | HOLOGON |
| 2 | 4.452 | 42X | 1ST | HOLOGoN |
| 3 | 3.870 | 48X | 2ND | GALVO |
| 4 | 4.412 | 42X | 2ND | GALVO |

*Semi-field angle in scan direction only; maximum semi-field angle is a compound angle due to both deflectors operating simultaneously.

3. CLEAR APERTURES ARE SUFFICIENT TO PASS BUNDLES WITH THE DIAMETER OF THE ENTRANCE PUPIL CENTERED AROUND SKEW CHIEF RAYS TERMINATING AT THE CORNERS OF THE 42X MODE 1ST AND 2ND FORMATS.

ENTRANCE PUPIL LOCATION = −70.0; GALVO LOCATION = −24.0

| CHIEF RAY DESCRIPTION | RAY ANGLE @ ENTR. PUPIL | GALVO ROT. IN ORTHOGONAL DIRECTION | IMAGE PLANE RAY INTERCEPT | DIAGRAM LOCATION |
|---|---|---|---|---|
| CORNER 42X - 1ST FMT. | 9.4069 | 3.7857 | (4.396, 3.496) | 15 |
| CORNER 42X - 2ND FMT. | 7.7571 | 4.7035 | (3.629, 4.355) | 16 |

4. PERFORMANCE

CONFIGURATION 1 - 48X MODE DEFLECTION BY HOLOGON

| DIAGRAM LOCATION | 2 | 3 | 4 | 5 | 6 | 7 |
|---|---|---|---|---|---|---|
| ANGLE (DEG.) | 1.0893 | 2.7234 | 4.3578 | 5.9928 | 7.6286 | 8.2306 |
| DESIRED RAY HT. | 0.5136 | 1.2840 | 2.0544 | 2.8245 | 3.5941 | 3.8786 |
| ACTUAL RAY HT. | 0.5167 | 1.2907 | 2.0620 | 2.8294 | 3.5915 | 3.8703 |
| DIFFERENCE | −0.0031 | −0.0067 | −0.0076 | −0.0049 | 0.0026 | 0.0083 |
| RMS OPD | 0.0098 | 0.0061 | 0.0068 | 0.0134 | 0.0174 | 0.0183 |

CONFIGURATION 2 - 42X MODE DEFLECTION BY HOLOGON

| DIAGRAM LOCATION | 2 | 3 | 4 | 5 | 6 | 7 |
|---|---|---|---|---|---|---|
| ANGLE (DEG.) | 1.6340 | 3.2681 | 4.9027 | 6.5379 | 8.1741 | 9.4069 |
| DESIRED RAY HT. | 0.7705 | 1.5411 | 2.3116 | 3.0810 | 3.8532 | 4.4323 |
| ACTUAL RAY HT. | 0.7749 | 1.5481 | 2.3183 | 3.0840 | 3.8442 | 4.4124 |
| DIFFERENCE | −0.0044 | −0.0070 | −0.0067 | −0.0030 | 0.0090 | 0.0199 |
| RMS OPD | 0.0088 | 0.0052 | 0.0090 | 0.0152 | 0.0182 | 0.0222 |

CONFIGURATION 3 - 48X MODE DEFLECTION BY GALVO (EQUIV. FOC. LENGTH = 26.967)

| DIAGRAM LOCATION | 8 | 9 | 10 | 11 | 12 | 13 |
|---|---|---|---|---|---|---|
| GALVO ROTATION (°) | .5447 | 1.3617 | 2.1789 | 2.9964 | 3.8143 | 4.1153 |
| ANGLE (°) | 1.0893 | 2.7234 | 4.3578 | 5.9928 | 7.6286 | 8.2306 |
| F*THETA | 0.5127 | 1.2818 | 2.0510 | 2.8206 | 3.5905 | 3.8738 |
| ACTUAL RAY HT. | 0.5166 | 1.2905 | 2.0619 | 2.8293 | 3.5915 | 3.8703 |
| DIFFERENCE | −0.0039 | −0.0087 | −0.0181 | −0.0088 | −0.0011 | 0.0035 |
| RMS OPD | 0.0099 | 0.0066 | 0.0043 | 0.0092 | 0.0142 | 0.0152 |

CONFIGURATION 4 - 42X MODE DEFLECTION BY GALVO (EQUIV. FOC. LENGTH = 26.967)

| DIAGRAM LOCATION | 8 | 9 | 10 | 11 | 12 | 13 |
|---|---|---|---|---|---|---|

TABLE 7-continued

| | | | | | | |
|---|---|---|---|---|---|---|
| GALVO ROTATION (°) | .8170 | 1.6341 | 2.4514 | 3.2690 | 4.0871 | 4.7035 |
| ANGLE (°) | 1.6340 | 3.2681 | 4.9027 | 6.5379 | 8.1741 | 9.4069 |
| F*THETA | 0.7691 | 1.5382 | 2.3075 | 3.0771 | 3.8472 | 4.4274 |
| ACTUAL RAY HT. | 0.7748 | 1.5480 | 2.3182 | 3.0840 | 3.8442 | 4.4122 |
| DIFFERENCE | −0.0057 | −0.0098 | −0.0107 | −0.0069 | 0.0029 | 0.0152 |
| RMS OPD | 0.0091 | 0.0052 | 0.0055 | 0.0111 | 0.0151 | 0.0149 |

RMS OPD PERFORMANCE FOR BUNDLES ON AXIS AND AT COMPOUND ANGLES
ENTRANCE PUPIL LOCATION = −70.0; GALVO LOCATION = −24.0.

| | RAY ANGLE @ ENTR. PUPIL | GALVO ROT. IN ORTHOGONAL DIR. | IMAGE PLANE RAY INTERCEPT |
|---|---|---|---|
| AXIS | 0.0000 | 0.0000 | (0.000, 0.000) |
| 70% CORN 48X 1ST FMT | 5.7614 | 2.3191 | (2.716, 2.177) |
| CORNER 48X 1ST FMT | 8.2306 | 3.3130 | (3.858, 3.078) |
| CORNER 48X 2ND FMT | 6.6261 | 4.1153 | (3.110, 3.833) |
| 70% CORN 42X 1ST FMT | 6.5848 | 2.6373 | (3.099, 2.469) |
| CORNER 42X 1ST FMT | 9.4069 | 3.7857 | (4.396, 3.496) |
| CORNER 42X 2ND FMT | 7.7571 | 4.7035 | (3.629, 4.355) |

| | DIAGRAM LOCATION | RMS OPD |
|---|---|---|
| AXIS | 1 | .010 |
| 70% CORN 48X 1ST FMT | 14 | .018 |
| CORNER 48X 1ST FMT | 15 | .022 |
| CORNER 48X 2ND FMT | 16 | .019 |
| 70% CORN 42X 1ST FMT | 14 | .021 |
| CORNER 42X 1ST FMT | 15 | .017 |
| CORNER 42X 2ND FMT | 16 | .019 |

5. THE DISTANCE(S) FROM THE ENTRANCE PUPIL(S) TO THE IMAGE PLANE OF THIS DESIGN MATCHES THE CORRESPONDING DISTANCE(S) OF EXAMPLE 9 IN TABLE 10.

Figure 15:
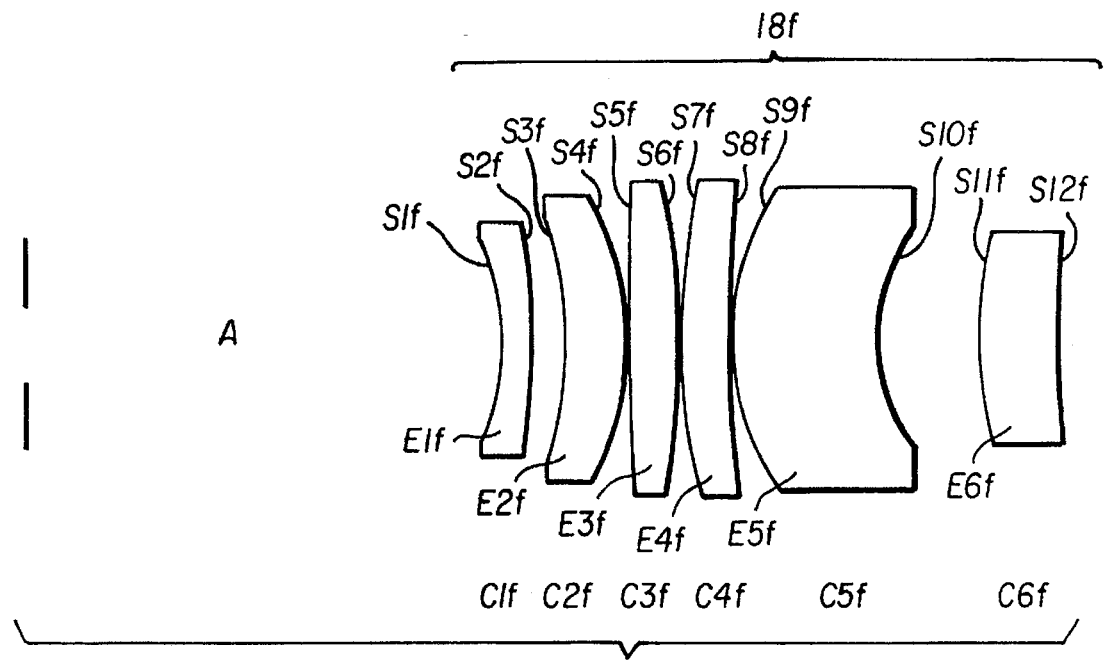
FIG. 15 is the schematic of the side view of the lens system 18f of the seventh embodiment.

The seventh preferred embodiment of the scan lens is a lens system 18f. It is illustrated in FIG. 15. It's parameters are provided in Table 8.

This lens system has a focal length of 54.03 mm, provides 24X coverage and has an F-number F/5.65.

The lens system 18f includes 6 lens components C1f–C6f.

The first lens component C1f is a negative power lens component. It corresponds to a biconcave lens element E1f. The front surface S1f of the lens component C1f is concave and faces the object side. The rear surface S2f of the lens component C1f is also concave.

The second optical component C2f is a positive power lens element E2f. The lens element E2f is a meniscus lens element. It has a front concave surface S3f and a rear (or image side) convex surface S4f.

The third optical component C3f is a positive power lens element E3f. The lens element E3f is biconvex. It has a front convex surface S5f and a rear convex surface S6f.

The fourth optical component C4f is a positive power lens element E4f. The lens element E4f is a meniscus lens element. It has a front convex surface S7f and a rear (or image side) concave surface S8f.

The fifth optical component C5f is a positive power lens element E5f. The lens element E5f is a thick meniscus lens element. It has a front convex surface S9f and a rear (or image side) concave surface S10f.

The sixth optical component C6f is a positive power lens element E6f. The lens element E6f is a meniscus lens element. It has a front convex surface S11f and a rear (or image side) concave surface S12f.

EXAMPLE 7

TABLE 8

| SURF. | CLEAR APER. (3) | AXIAL BEAM | RADIUS | THICK-THICKNESS | INDEX | V-NUMBER |
|---|---|---|---|---|---|---|
| | 9.56 | 9.56 | DIAPHRAGM | A | | |
| 1 | 29.45 | 9.56 | −31.0214 | 4.183 | 1.517 | 64.2 |
| 2 | 33.35 | 10.03 | −104.555 | 4.983 | | |
| 3 | 35.64 | 10.56 | −50.6343 | 8.949 | 1.805 | 25.4 |
| 4 | 40.70 | 11.92 | −40.9417 | 0.150 | | |
| 5 | 43.44 | 11.95 | 534.535 | 7.250 | 1.805 | 25.4 |
| 6 | 44.45 | 12.05 | −121.489 | 0.200 | | |
| 7 | 44.87 | 12.02 | 99.5818 | 7.250 | 1.805 | 25.4 |
| 8 | 43.99 | 11.43 | 267.602 | 0.177 | | |
| 9 | 43.16 | 11.37 | 40.0994 | 21.100 | 1.805 | 25.4 |
| 10 | 30.91 | 7.36 | 26.8715 | 14.055 | | |
| 11 | 30.28 | 5.64 | 59.0334 | 11.526 | 1.805 | 25.4 |
| 12 | 27.60 | 4.36 | 151.299 | | | |

TABLE 8-continued

NOTES:
1. F/# = 5.65
   EF = 54.03
   FORMATS: 1ST: 15.515 × 12.488 (HOLOGON × GALVO)
             2ND: 12.488 × 15.515 (HOLOGON × GALVO)
2. CONFIGURATION INFORMATION

| CFG | BF | FF | BEST FOCUS | A |
|---|---|---|---|---|
| 1 | 24.581 | 34.93 | −.0162 | 70.000 |
| 2 | 24.581 | 34.93 | −.0162 | 24.000 |

| CFG | N.P. LOC. | N.P. DIAM. | X.P. LOC. | X.P. DIAM. |
|---|---|---|---|---|
| 1 | −70.00 | 9.56 | 107.82 | 14.73 |
| 2 | −24.00 | 9.56 | −242.50 | 47.26 |

| CFG | EF | LENS LENGTH | STOP DIAM. | REL. APER. | SEMI FIELD* |
|---|---|---|---|---|---|
| 1 | 54.03 | 79.823 | 9.56 | 5.65 | 8.231 |
| 2 | 54.03 | 79.823 | 9.56 | 5.65 | 8.231 |

| CFG | EDGE OF SCAN | FORMAT | DEFLECTOR AT ENTRANCE PUPIL |
|---|---|---|---|
| 1 | 7.757 | 1ST | HOLOGON |
| 2 | 7.757 | 2ND | GALVO |

*Semi-field angle in scan direction only; maximum semi-field angle is a compound angle due to both deflectors operating simultaneously.

3. CLEAR APERTURES ARE SUFFICIENT TO PASS BUNDLES WITH THE DIAMETER OF THE ENTRANCE PUPIL CENTERED AROUND SKEW CHIEF RAYS TERMINATING AT THE CORNERS OF THE 1ST AND 2ND FORMAT.
ENTRANCE PUPIL LOCATION = −70; GALVO LOCATION = −24.

| CHIEF RAY DESCRIPTION | RAY ANGLE @ ENTR. PUPIL | GALVO ROT. IN ORTHOGONAL DIRECTION | IMAGE PLANE RAY INTERCEPT | DIAGRAM LOCATION |
|---|---|---|---|---|
| CORNER 42X - 1ST FMT. | 8.2306 | 3.3132 | (7.775, 6.201) | 15 |
| CORNER 42X - 2ND FMT. | 6.6248 | 4.1153 | (6.266, 7.723) | 16 |

4. PERFORMANCE
CONFIGURATION 1 - DEFLECTION BY HOLOGON

| DIAGRAM LOCATION | 2 | 3 | 4 | 5 | 6 | 7 |
|---|---|---|---|---|---|---|
| ANGLE (DEG.) | 0.5446 | 2.1786 | 3.8129 | 5.4477 | 7.0832 | 8.2306 |
| DESIRED RAY HT. | 0.5136 | 2.0543 | 3.5941 | 5.1388 | 6.6777 | 7.7572 |
| ACTUAL RAY HT. | 0.5137 | 2.0547 | 3.5955 | 5.1360 | 6.6766 | 7.7573 |
| DIFFERENCE | −0.0001 | −0.0004 | −0.0014 | 0.0028 | 0.0010 | −0.0001 |
| RMS OPD | 0.0167 | 0.0132 | 0.0085 | 0.0114 | 0.0178 | 0.0193 |

CONFIGURATION 2 - DEFLECTION BY GALVO (EQUIV. FOCAL LENGTH = 54.007)

| DIAGRAM LOCATION | 8 | 9 | 10 | 11 | 12 | 13 |
|---|---|---|---|---|---|---|
| GALVO ROTATION (°) | 0.2723 | 1.0893 | 1.9605 | 2.7239 | 3.5416 | 4.1153 |
| ANGLE (°) | 0.5446 | 2.1786 | 3.8129 | 5.4477 | 7.0832 | 8.2306 |
| F*THETA | 0.S 133 | 2.0536 | 3.5940 | 5.1350 | 6.6766 | 7.7582 |
| ACTUAL RAY HT. | 0.5135 | 2.0542 | 3.5949 | 5.1356 | 6.6765 | 7.7574 |
| DIFFERNCE | −0.0002 | −0.0007 | −0.0008 | −0.0006 | 0.0002 | 0.0008 |
| RMS OPD | 0.0168 | 0.0141 | 0.0093 | 0.0064 | 0.0095 | 0.0116 |

RMS OPD PERFORMANCE FOR BUNDLES ON AXIS AND AT COMPOUND ANGLES
ENTRANCE PUPIL LOCATION = −70.0; GALVO LOCATION = −24.0.

|  | RAY ANGLE @ ENTR. PUPIL | GALVO ROT. IN ORTHOGONAL DIR. | IMAGE PLANE RAY INTERCEPT |
|---|---|---|---|
| AXIS | 0.0000 | 0.0000 | (0.000, 0.000) |
| 70% CORNER 1ST FMT | 5.7614 | 2.3187 | (5.436, 4.356) |
| CORNER 1ST FMT | 8.2306 | 3.3123 | (7.775, 6.201) |
| CORNER 2ND FMT | 6.6248 | 4.1153 | (6.266, 7.723) |

TABLE 8-continued

| | DIAGRAM LOCATION | RMS OPD |
|---|---|---|
| AXIS | 1 | .0170 |
| 70% CORNER 1ST FMT | 14 | .0176 |
| CORNER 1ST FMT | 15 | .0157 |
| CORNER 2ND FMT | 16 | .0235 |

5. THE DISTANCE(S) FROM THE ENTRANCE PUPIL(S) TO THE IMAGE PLANE OF THIS DESIGN MATCHES THE CORRESPONDING DISTANCE(S) OF EXAMPLE 6 IN TABLE 7.
6. SF-6 MAY BE SUBSTITUTED FOR SFL-6. ALL GLASSES MUST BE CERTIFIED ACCEPTABLE REGARDING SAFETY STANDARDS.

Figure 16:
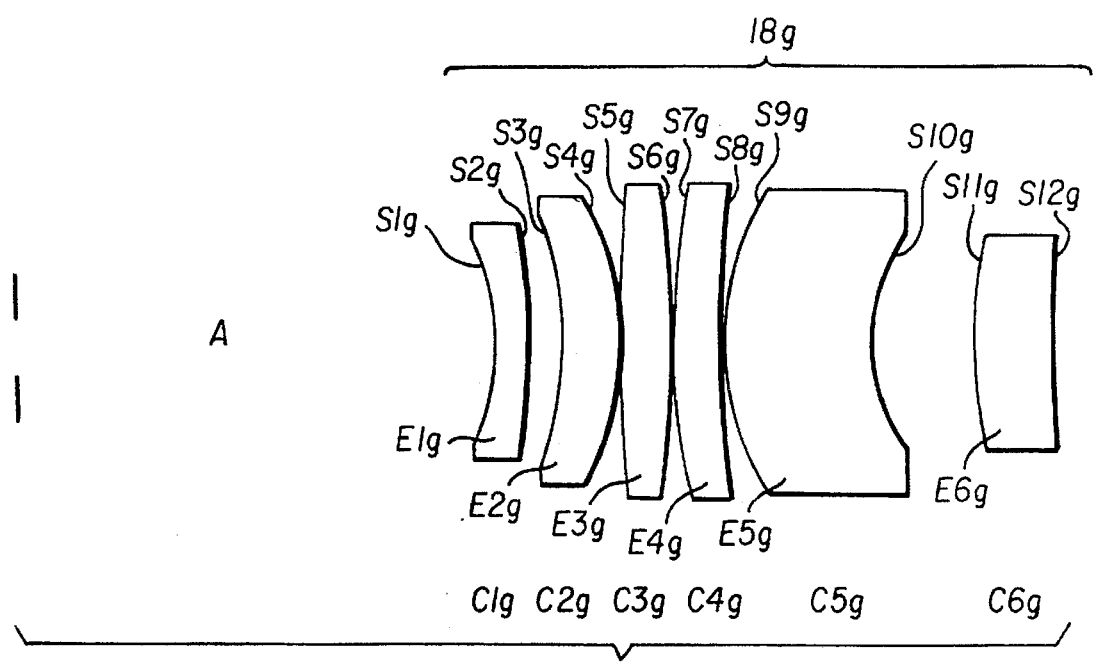
FIG. 16 is the schematic of the side view of the lens system 18g of the eighth embodiment.

The eighth preferred embodiment of the scan lens is a lens system 18g. It is illustrated in FIG. 16. It's parameters are provided in Table 9.

This lens system has a focal length of 54.02 mm, provides 24X coverage and has an F-numbers F/5.65.

The lens system 18g includes 6 lens components C1g–C6g.

The first lens component C1g is a negative power lens component. It corresponds to a biconcave lens element E1g. The front surface S1g of the lens component C1g is concave and faces the object side. The rear surface S2g of the lens component C1g is also concave.

The second optical component C2g is a positive power lens element E2g. The lens element E2g is a meniscus lens element. It has a front concave surface S3g and a rear (or image side) convex surface S4g.

The third optical component C3g is a positive power lens element E3g. The lens element E3g is biconvex. It has a front convex surface S5g and a rear convex surface S6g.

The fourth optical component C4g is a positive power lens element E4g. The lens element E4g is a meniscus lens element. It has a front convex surface S7g and a rear (or image side) concave surface S8g.

The fifth optical component C5g is a positive power lens element E5g. The lens element E5g is a meniscus lens element. It has a front convex surface S9g and a rear (or image side) concave surface S10g.

The sixth optical component C6g is a positive power lens element E6g. The lens element E6g is a meniscus lens element. It has a front convex surface S11g and a rear (or image side) concave surface S12g.

EXAMPLE 8

TABLE 9

| SURF. | CLEAR APER. (5) | AXIAL BEAM | RADIUS | THICK-NESS | INDEX | V-NUMBER | SPECIAL NOTES |
|---|---|---|---|---|---|---|---|
| | 9.56 | 9.56 | DIAPHRAGM | A | | | |
| 1 | 29.46 | 9.56 | −31.1064 | 4.194 | 1.517 | 64.2 | BK-7 |
| 2 | 33.34 | 10.03 | −103.666 | 4.986 | | | |
| 3 | 35.72 | 10.56 | −52.9247 | 8.950 | 1.834 | 37.2 | OHARA LASF-010 |
| 4 | 40.64 | 11.89 | −41.5045 | 0.150 | | | |
| 5 | 43.27 | 11.91 | 380.484 | 7.250 | 1.834 | 37.2 | OHARA LASF-010 |
| 6 | 44.15 | 11.95 | −146.103 | 0.200 | | | |
| 7 | 44.47 | 11.92 | 104.234 | 7.250 | 1.834 | 37.2 | OHARA LASF-010 |
| 8 | 43.56 | 11.33 | 244.357 | 0.177 | | | |
| 9 | 42.83 | 11.27 | 40.3800 | 21.100 | 1.834 | 37.2 | OHARA LASF-010 |
| 10 | 30.69 | 7.30 | 27.1084 | 14.055 | | | |
| 11 | 30.20 | 5.60 | 61.3343 | 11.530 | 1.834 | 37.2 | OHARA LASF-010 |
| 12 | 27.64 | 4.36 | 174.548 | | | | |

1. F/# = 5.65
   EF = 54.02
   FORMATS:   1ST: 15.515 × 12.488 (HOLOGON × GALVO)
              2ND: 12.488 × 15.515 (HOLOGON × GALVO)
2. CONFIGURATION INFORMATION

| CFG | BE | FF | BEST FOCUS | A |
|---|---|---|---|---|
| 1 | 24.562 | 34.77 | −0.0156 | 70.000 |
| 2 | 24.562 | 34.77 | −0.0156 | 24.000 |

| CFG | N.P. LOC. | N.P. DIAM. | X.P. LOC. | X.P. DIAM. |
|---|---|---|---|---|
| 1 | −70.00 | 9.56 | 107.40 | 14.66 |
| 2 | −24.00 | 9.56 | −246.43 | 47.95 |

TABLE 9-continued

| CFG | EE | LENS LENGTH | STOP DIAM. | REL. APER. | SEMI FIELD* |
|---|---|---|---|---|---|
| 1 | 54.02 | 79.842 | 9.56 | 5.65 | 8.231 |
| 2 | 54.02 | 79.842 | 9.56 | 5.65 | 8.231 |

| CFG | EDGE OF SCAN | FORMAT | DEFLECTOR AT ENTRANCE PUPIL |
|---|---|---|---|
| 1 | 7.158 | 1ST | HOLOGON |
| 2 | 7.758 | 2ND | GALVO |

*Semi-field angle in scan direction only; maximum semi-field angle is a compound angle due to both deflectors operating simultaneously.

3. CLEAR APERTURES ARE SUFFICIENT TO PASS BUNDLES WITH THE DIAMETER OF THE ENTRANCE PUPIL CENTERED AROUND SKEW CHIEF RAYS TERMINATING AT THE CORNERS OF THE 1ST AND 2ND FORMAT.
ENTRANCE PUPIL LOCATION = −70; GALVO LOCATION = −24.

| CHIEF RAY DESCRIPTION | RAY ANGLE @ ENTR. PUPIL | GALVO ROT. IN ORTHOGONAL DIRECTION | IMAGE PLANE RAY INTERCEPT | DIAGRAM LOCATION |
|---|---|---|---|---|
| CORNER 42X - 1ST FMT. | 8.2306 | 3.3132 | (7.776, 6.202) | 15 |
| CORNER 42X - 2ND FMT. | 6.6248 | 4.1153 | (6.267, 7.724) | 16 |

4. PERFORMANCE
CONFIGURATION 1 - DEFLECTION BY HOLOGON

| DIAGRAM LOCATION | 2 | 3 | 4 | 5 | 6 | 7 |
|---|---|---|---|---|---|---|
| ANGLE (DEG.) | 0.5446 | 2.1786 | 3.8129 | 5.4477 | 7.0832 | 8.2306 |
| DEIRED RAY HT. | 0.5136 | 2.0543 | 3.5941 | 5.1388 | 6.6777 | 7.7572 |
| ACTUAL RAY HT. | 0.5136 | 2.0544 | 3.5950 | 5.1357 | 6.6767 | 7.7577 |
| DIFFERNCE | −0.0000 | −0.0001 | −0.0009 | 0.0031 | 0.0011 | −0.0005 |
| RMS OPD | 0.0158 | 0.0123 | 0.0083 | 0.0121 | 0.0185 | 0.0196 |

CONFIGURATION 2 - DEFLECTION BY GALVO (EQUIV. FOCAL LENGTH = 54.006)

| DIAGRAM LOCATION | 8 | 9 | 10 | 11 | 12 | 13 |
|---|---|---|---|---|---|---|
| GALVO ROTATION (°) | 0.2723 | 1.0893 | 1.9605 | 2.7239 | 3.5416 | 4.1153 |
| ANGLE (°) | 0.5446 | 2.1786 | 3.8129 | 5.4477 | 7.0832 | 8.2306 |
| F*THETA | 0.5133 | 2.0535 | 3.5940 | 5.1349 | 6.6765 | 7.7581 |
| ACTUAL RAY HT. | 0.5134 | 2.0539 | 3.5944 | 5.1352 | 6.6764 | 7.7577 |
| DIFFERENCE | −0.0001 | −0.0004 | −0.0005 | −0.0003 | 0.0001 | 0.0004 |
| RMS OPD | 0.0158 | 0.0134 | 0.0089 | 0.0062 | 0.0090 | 0.0111 |

RMS OPD PERFORMANCE FUR BUNDLES ON AXIS AND AT COMPOUND ANGLES
ENTRANCE PUPIL LOCATION = −70.0; GALVO LOCATION = −24.0

| | RAY ANGLE @ ENTR. PUPIL | GALVO ROT. IN ORTHOGONAL DIR. | IMAGE PLANE RAY INTERCEPT |
|---|---|---|---|
| AXIS | 0.0000 | 0.0000 | (0.000, 0.000) |
| 70% CORNER 1ST FMT | 5.7614 | 2.3187 | (5.437, 4.357) |
| CORNER 1ST FMT | 8.2306 | 3.3123 | (7.776, 6.202) |
| CORNER 2ND FMT | 6.6248 | 4.1153 | (6.267, 7.724) |

| | DIAGRAM LOCATION | RMS OPD |
|---|---|---|
| AXIS | 1 | .0160 |
| 70% CORNER 1ST FMT | 14 | .0183 |
| CORNER 1ST FMT | 15 | .0155 |
| CORNER 2ND FMT | 16 | .0238 |

5. THE DISTANCE(S) FROM THE ENTRANCE PUPIL(S) TO THE IMAGE PLANE OF THIS DESIGN MATCHES THE CORRESPONDING DISTANCE(S) OF EXAMPLE 6 IN TABLE 7.
6. CONTACT DESIGN DEPARTMENT BEFORE SUBSTITUTING GLASSES. ALL GLASSES MUST BE CERTIFIED ACCEPTABLE REGARDING SAFETY STANDARDS.

The parameters for the last three embodiments, Examples 9, 10 and 11, correspond to lens systems 18H, 18i and 18j.

Figure 17:
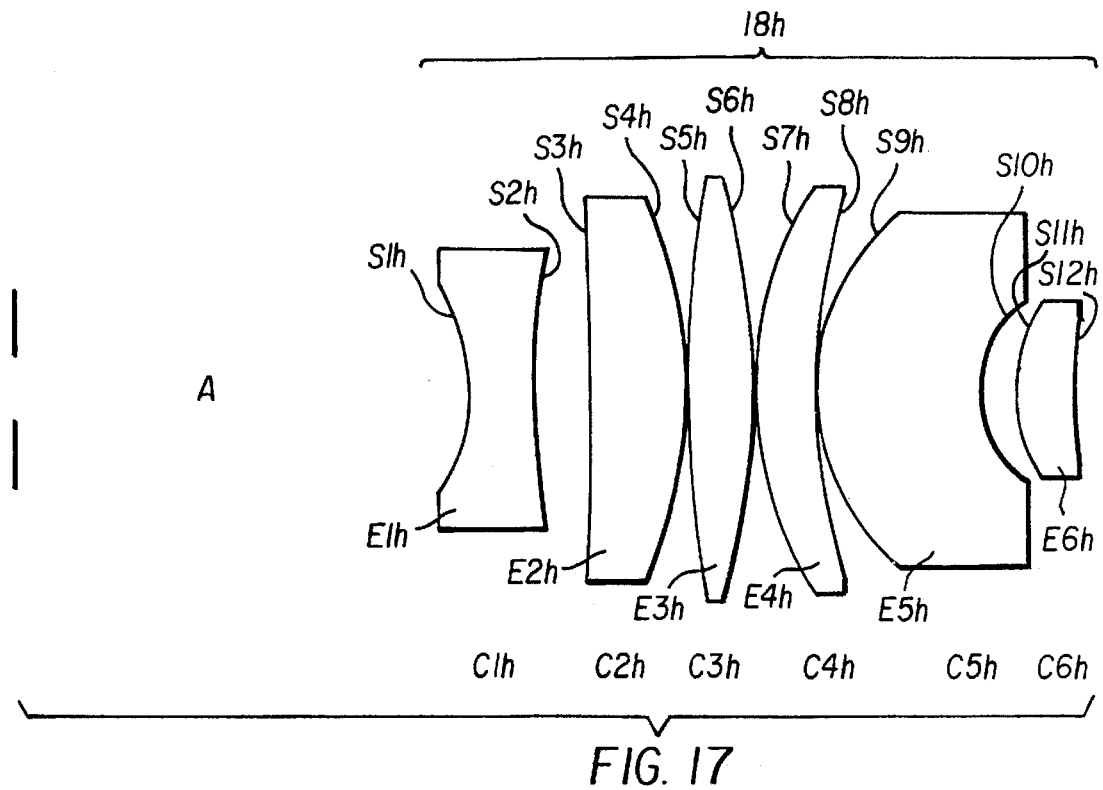
FIG. 17 is the schematic of the side view of the lens system 18h of the ninth embodiment.
Figure 18:
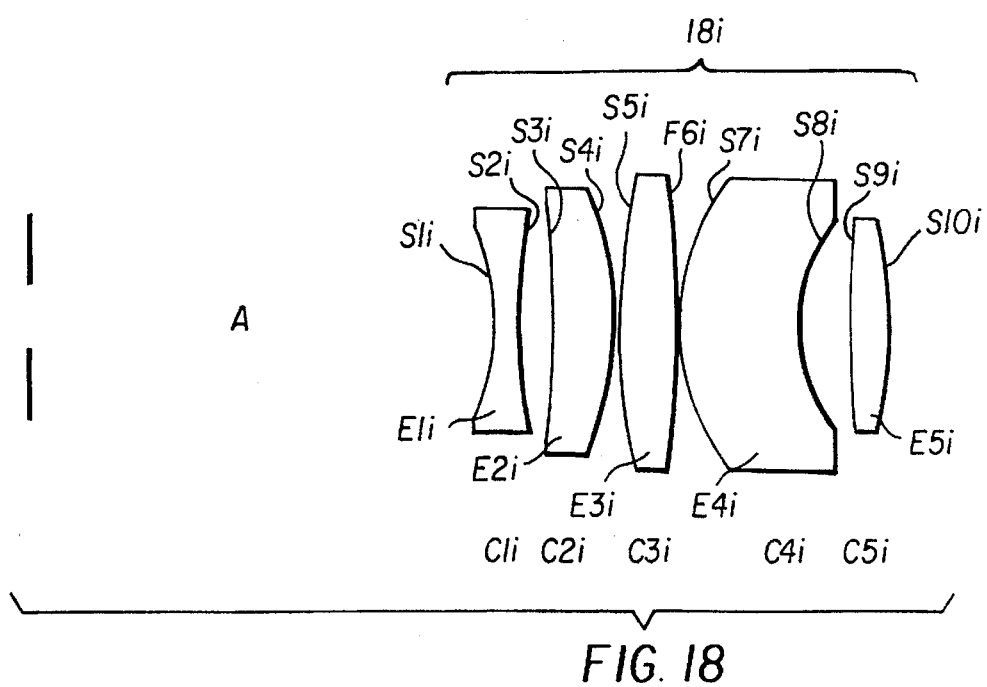
FIG. 18 is the schematic of the side view of the lens system 18i of the tenth embodiment.
Figure 19:
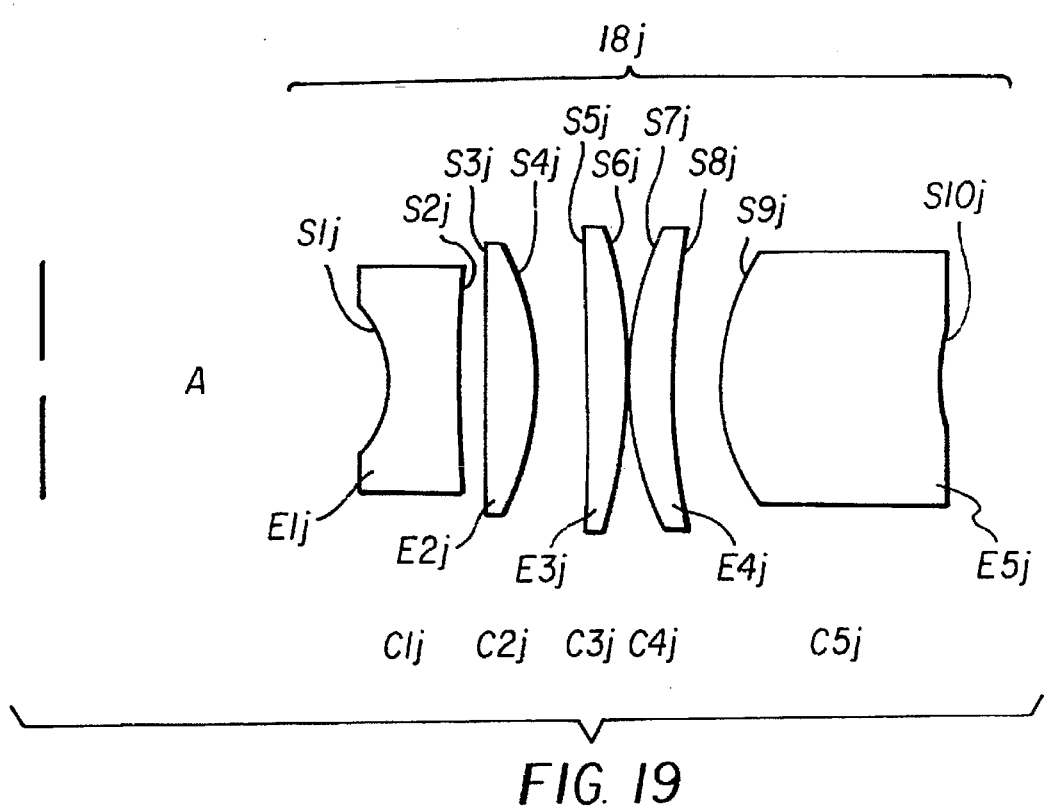
FIG. 19 is the schematic of the side view of the lens system 18j of the eleventh embodiment.

They are illustrated in FIGS. 17, 18, and 19 and their parameters are provided below in Tables 10, 11 and 12, respectively.

EXAMPLE 9

TABLE 10

| SURF. | CLEAR APER. | AXIAL BEAM | RADIUS | THICK-NESS | INDEX | V-NUMBER | SPECIAL NOTES |
|---|---|---|---|---|---|---|---|
|  | 9.56 | 9.56 | DIAPHRAGM | A |  |  |  |
| 1 | 31.20 | 9.56 | −28.3964 | 9.753 | 1.517 | 64.2- | BK-7 |
| 2 | 41.72 | 10.75 | 112.662 | 8.223 |  |  |  |
| 3 | 49.99 | 12.57 | −631.554 | 14.591 | 1.805 | 25.4 | SFL-6 |
| 4 | 56.75 | 14.49 | −72.1304 | 0.150 |  |  |  |
| 5 | 62.20 | 14.54 | 184.339 | 10.000 | 1.805 | 25.4 | SFL-6 |
| 6 | 62.68 | 14.63 | −108.480 | 0.200 |  |  |  |
| 7 | 60.41 | 14.54 | 55.3311 | 9.000 | 1.805 | 25.4 | SFL-6 |
| 8 | 57.48 | 13.07 | 93.2760 | 0.150 |  |  |  |
| 9 | 52.50 | 12.97 | 34.2902 | 24.870 | 1.805 | 25.4 | SFL-6 |
| 10 | 27.37 | 6.19 | 16.9223 | 4.688 |  |  |  |
| 11 | 26.42 | 5.27 | 22.3953 | 9.000 | 1.805 | 25.4 | SFL-6 |
| 12 | 21.64 | 3.35 | 75.2922 |  |  |  |  |

NOTES:
1. F/# = 2.84
   EF = 27.17
   FORMATS:  1ST FORMAT OF 48X MODE: 7.756 × 6.244 (HOE × GALVO)
   2ND FORMAT OF 48X MODE: 6.244 × 7.756 (HOE × GALVO)
   1ST FORMAT OF 42X MODE: 8.866 × 7.136 (HOE × GALVO)
   2ND FORMAT OF 42X MODE: 7.136 × 8.866 (HOE × GALVO)
2. CONFIGURATION INFORMATION

| CFG | BE | FF | BEST FOCUS | A |
|---|---|---|---|---|
| 1 | 9.3760 | 2.59 | −.0009 | 70.000 |
| 2 | 9.3760 | 2.59 | −.0009 | 70.000 |
| 3 | 9.3760 | 2.59 | −.0009 | 24.000 |
| 4 | 9.3760 | 2.59 | −.0009 | 24.000 |

| CFG | N.P. LOC. | N.P. DIAM. | X.P. LOC. | X.P. DIAM. |
|---|---|---|---|---|
| 1 | −70.00 | 9.56 | 20.31 | 3.85 |
| 2 | −70.00 | 9.56 | 20.31 | 3.85 |
| 3 | −24.00 | 9.56 | 43.80 | 12.12 |
| 4 | −24.00 | 9.56 | 43.80 | 12.12 |

| CFG | EF | LENS LENGTH | STOP DIAM. | REL. APER. | SEMI FIELD |
|---|---|---|---|---|---|
| 1 | 27.15 | 90.625 | 9.56 | 2.84 | 8.231° |
| 2 | 27.15 | 90.625 | 9.56 | 2.84 | 9.407° |
| 3 | 27.15 | 90.625 | 9.56 | 2.84 | 8.231° |
| 4 | 27.15 | 90.625 | 9.56 | 2.84 | 9.407° |

| CFG | SEMI DRAG | MODE | FORMAT | DEFLECTOR AT ENTRANCE PUPIL |
|---|---|---|---|---|
| 1 | 3.879 | 48X | 1ST | HOLOGON |
| 2 | 4.432 | 42X | 1ST | HOLOGON |
| 3 | 3.879 | 48X | 2ND | GALVO |
| 4 | 4.432 | 42X | 2ND | GALVO |

3. PERFORMANCE
CONFIGURATION 1

| | | | | | | |
|---|---|---|---|---|---|---|
| ANGLE (DEG.) | 1.0893 | 2.7234 | 4.3578 | 5.9928 | 7.6286 | 8.2306 |
| DESIRED RAY HT. | 0.5136 | 1.2840 | 2.0544 | 2.8245 | 3.5941 | 3.8786 |
| ACTUAL RAY HT. | 0.5161 | 1.2894 | 2.0606 | 2.8288 | 3.5929 | 3.8729 |
| DIFFERENCE | −0.0025 | −0.0054 | −0.0063 | −0.0043 | 0.0012 | 0.0057 |
| RMS OPD | 0.0078 | 0.0072 | 0.0068 | 0.0052 | 0.0061 | 0.0086 |

CONFIGURATION 2

| | | | | | | |
|---|---|---|---|---|---|---|
| ANGLE (DEG.) | 1.6340 | 3.2681 | 4.9027 | 6.5379 | 8.1741 | 9.4069 |
| DESIRED RAY HT. | 0.7705 | 1.5411 | 2.3116 | 3.0810 | 3.8532 | 4.4323 |
| ACTUAL RAY HT. | 0.7740 | 1.5467 | 2.3171 | 3.0840 | 3.8467 | 4.4180 |
| DIFFERNCE | −0.0035 | −0.0057 | −0.0055 | −0.0029 | 0.0065 | 0.0143 |
| RMS OPD | 0.0073 | 0.0071 | 0.0064 | 0.0047 | 0.0083 | 0.0179 |

TABLE 10-continued

| CONFIGURATION 3 (EQUIV. FOCAL LENGTH = 27.005) | | | | | | |
|---|---|---|---|---|---|---|
| ANGLE (DEG.) | 1.0893 | 2.7234 | 4.3578 | 5.9928 | 7.6286 | 8.2306 |
| F*THETA | 0.5134 | 1.2836 | 2.0539 | 3.8246 | 3.5955 | 4.8793 |
| ACTUAL RAY HT. | 0.5160 | 1.2893 | 2.0606 | 2.8288 | 3.5929 | 3.8729 |
| DIFFERENCE | 0.0026 | 057 | 0.0067 | 0.0042 | −0.0026 | −0.0064 |
| RMS OPD | 0.0066 | 0.0030 | 0.0034 | 0.0083 | 0.0102 | 0.0105 |
| CONFIGURATION 4 (EQUIV. FOCAL LENGTH = 26.974) | | | | | | |
| ANGLE (°) | 1.6340 | 3.2681 | 4.9027 | 6.5379 | 8.1741 | 9.4069 |
| F*THETA | 0.7693 | 1.5386 | 2.3081 | 3.0780 | 3.8483 | 4.4287 |
| ACTUAL RAY HT. | 0.7740 | 1.5467 | 2.3170 | 3.0840 | 3.8466 | 4.4177 |
| DIFFERENCE | 0.0047 | 0.0081 | 0.0089 | 0.0060 | −0.0017 | −0.0110 |
| RMS OPD | 0.0057 | 0.0017 | 0.0052 | 0.0093 | 0.0105 | 0.0158 |

4. THE DISTANCE(S) FROM THE ENTRANCE PUPIL(S) TO THE IMAGE PLANE OF THIS DESIGN MATCHES THE CORRESPONDING DISTANCE(S) OF EXAMPLE 10 IN TABLE 11.
5. SF-6 MAY BE SUBSTITUTED FOR SFL-6 IF DESIRED.

EXAMPLE 10

TABLE 11

| SURF. | CLEAR APER. | AXIAL BEAM | RADIUS | THICK-NESS | INDEX | V-NUMBER | GLASS |
|---|---|---|---|---|---|---|---|
|  | 9.56 | 9.56 | DIAPHRAGM | A | | | |
| 1 | 28.91 | 9.56 | −35.1825 | 4.000 | 1.517 | 64.2 | BK-7 |
| 2 | 33.12 | 9.98 | 92.6682 | 5.005 | | | |
| 3 | 35.53 | 10.92 | −128.298 | 9.000 | 1.805 | 25.4 | SFL-6 |
| 4 | 39.72 | 12.21 | −50.1277 | 0.642 | | | |
| 5 | 43.71 | 12.29 | 94.2570 | 9.000 | 1.805 | 25.4 | SFL-6 |
| 6 | 44.08 | 12.12 | −184.339 | 0.177 | | | |
| 7 | 43.50 | 12.05 | 34.5115 | 18.000 | 1.847 | 23.8 | SFL-57 |
| 8 | 31.82 | 8.33 | 24.4424 | 7.962 | | | |
| 9 | 31.83 | 7.61 | 186.648 | 6.124 | 1.517 | 64.2 | BK-7 |
| 10 | 31.64 | 7.15 | −60.0977 | | | | |

NOTES:
1. F/# = 5.64
   EF = 53.95
   FORMATS: 1ST FORMAT: 15.515 × 12.488 (HOLOGON × GALVO)
   2ND FORMAT: 12.488 × 15.515 (HOLOGON × GALVO)
2. CONFIGURATION INFORMATION

| CFG | BF | EE | BEST FOCUS | A |
|---|---|---|---|---|
| 1 | 40.1107 | 31.52 | −.02110 | 70.000 |
| 2 | 40.1107 | 31.52 | −.02100 | 24.000 |

| CFG | N.P. LOC. | N.P. DIAM. | X.P. LOC. | X.P. DIAM. |
|---|---|---|---|---|
| 1 | −70.00 | 9.56 | 115.75 | 13.40 |
| 2 | −24.00 | 9.56 | −346.97 | 68.60 |

| CFG | EF | LENS LENGTH | STOP DIAM. | REL. APER. |
|---|---|---|---|---|
| 1 | 53.95 | 59.910 | 9.56. | 5.64 |
| 2 | 53.95 | 59.910 | 9.56 | 5.64 |

| CFG | SEMI FIELD | SEMI DRAG | FORMAT | DEFLECTOR AT ENTRANCE PUPIL |
|---|---|---|---|---|
| 1 | 8.231 | 7.757 | 1ST | HOLOGON |
| 2 | 8.231 | 7.673 | 2ND | GALVO |

3. PERFORMANCE
CONFIGURATION 1

| ANGLE (DEG.) | 0.5446 | 2.1786 | 3.8129 | 5.4477 | 7.0832 | 8.2306 |
|---|---|---|---|---|---|---|
| DESIRED RAY HT. | 0.5136 | 2.0543 | 3.5941 | 5.1388 | 6.6777 | 7.7572 |
| ACTUAL RAY HT. | 0.5129 | 2.0519 | 3.5913 | 5.1321 | 6.6764 | 7.7633 |
| DIFFERNCE | 0.0006 | 0.0024 | 0.0028 | 0.0067 | 0.0012 | −0.0062 |
| RMS OPD | 0.0228 | 0.0144 | 0.0170 | 0.0212 | 0.0096 | 0.0232 |

TABLE 11-continued

| CONFIGURATION 2 (EQUIV. FOCAL LENGTH = 54.0110) | | | | | | |
|---|---|---|---|---|---|---|
| ANGLE (DEG.) | 0.5446 | 2.1786 | 3.8129 | 5.4477 | 7.0832 | 8.2306 |
| F*THETA | 0.5134 | 2.0537 | 3.5943 | 5.1354 | 6.6771 | 7.7587 |
| ACTUAL RAY HT. | 0.5128 | 2.0515 | 3.5911 | 5.1326 | 6.6771 | 7.7627 |
| DIFFERENCE | −0.0006 | −0.0022 | −0.0032 | −0.0028 | −0.0000 | 0.0040 |
| RMS OPD | 0.0232 | 0.0184 | 0.0096 | 0.0035 | 0.0075 | 0.0138 |

4. THE DISTANCE(S) FROM THE ENTRANCE PUPIL(S) TO THE IMAGE PLANE OF THIS DESIGN MATCHES THE CORRESPONDING DISTANCE(S) OF EXAMPLE 9 IN TABLE 10.
5. SF-6 AND SF-57 MAY BE SUBSTITUTED FOR SFL-6 AND SFL-57 IF DESIRED.

EXAMPLE 11

TABLE 12

| SURF. | CLEAR APER. | AXIAL BEAM | RADIUS | THICK-NESS | INDEX | V-NUMBER | GLASS |
|---|---|---|---|---|---|---|---|
|   | 9.14 | 9.14 | DIAPHRAGM | 71.000 | | | |
| 1 | 28.68 | 9.14 | −23.4834 | 15.885 | 1.547 | 53.6 | BALF-5 |
| 2 | 43.74 | 11.42 | 287.364 | 5.389 | | | |
| 3 | 49.84 | 12.69 | PLANO | 10.916 | 1.805 | 25.4 | SF-6 |
| 4 | 52.67 | 14.07 | −56.0766 | 10.008 | | | |
| 5 | 58.31 | 14.44 | −1464.21 | 9.000 | 1.805 | 25.4 | SF-6 |
| 6 | 59.32 | 14.65 | −100.678 | 0.200 | | | |
| 7 | 58.06 | 14.59 | 70.0432 | 8.947 | 1.805 | 25.4 | SF-6 |
| 8 | 55.62 | 13.42 | 144.437 | 9.809 | | | |
| 9 | 48.35 | 11.76 | 44.5149 | 46.000 | 1.805 | 25.4 | SF-6 |
| 10 | 15.32 | 2.15 | 45.7245 | | | | |

NOTES:
F/# = 2.95
EF = 26.98
PERFORMANCE

| ANGLE (DEG.) | 1.6340 | 3.2681 | 4.9027 | 6.5379 | 8.1741 | 8.4079 |
|---|---|---|---|---|---|---|
| DESIRED RAY HT. | .7656 | 1.5311 | 2.2966 | 3.0621 | 3.8277 | 3.9370 |
| ACTUAL RAY HT. | .7688 | 1.5363 | 2.3019 | 3.0647 | 3.8242 | 3.9324 |
| DIFFERNCE | −0.0032 | −0.0052 | −0.0053 | −0.0026 | +0.0035 | +0.0046 |
| P-V OPD | .042 | .045 | .058 | .066 | .085 | .093 |

| IMAGE HEIGHT | ANGULAR FIELD | APPROX. REL ILLUM. (IMAGE) | MAX. APER. WITH NO VIGNETTING |
|---|---|---|---|
| 1.38 | 2.94 | 1.00 | F/3.0 |
| 2.76 | 5.89 | 1.01 | F/3.0 |
| 3.93 | 8.41 | 1.03 | F/3.0 |

| PUPIL | LOCATION | DIAMETER |
|---|---|---|
| Ent. | −71.00 | 9.14 |
| Exit | 16.87 | 3.60 |

The invention has been described in detail with particular reference to a preferred embodiment thereof, but it will be understood that variations and modifications can be effected within the spirit and scope of the invention. For example, other types of diffractive surfaces can be substituted for the holographic surface of a deflector. The deflectors may be switched in their positions, other types of dual deflector systems may be used and one or more aspheric or diffractive surfaces may be added to a scan lens system.

What is claimed is:

1. A lens for projecting a beam of radiation moving along an optical path from front to rear, said lens comprising three groups of lens elements in order:

a negative group with a front-most lens element concave to the front;

a first positive group of lens elements having at least two positive power lens elements and no negative lens elements, the front most lens element of said first positive group having its strongest surface facing the rear; and a second positive group of lens elements, said second positive group having stronger optical power than said first positive group, said second positive group including at least one positive meniscus lens component which is concave to the rear, wherein $$-1.65 \leq \frac{efl_1}{efl} \leq -0.86,$$

$$0.60 \leq \frac{efl_2}{efl} \leq 1.36, \text{ and}$$

-continued $$2.47 \leq \frac{efl_3}{efl} \leq 4.65,$$

where efl is the focal length of said lens, $efl_1$ is the focal length of said first negative lens group, $efl_2$ is the focal length of said first positive lens group and $efl_3$ is the focal length of said second positive lens group.

2. A lens according to claim 1, wherein said negative group consists of a single lens element satisfying the following condition:

$0.58 \leq X \leq 0.65$, and $X=(C1+C2)/(C1-C2)$, where X is the bending of said single lens element, and C1 and C2 are the curvatures of first and second surfaces of said single lens element.

3. A lens according to claim 1, wherein said front-most lens element of said negative group meets the following bending condition:

$0.82 \leq X \leq 1.02$, and $X=(C1+C2)/(C1-C2)$, where X is the bending of said front-most lens element, and C1 and C2 are the curvatures of first and second lens surfaces of said front-most lens element.

4. A lens according to claim 1, wherein said first positive group comprises three positive lens elements, said three positive lens elements satisfying the following conditions:

$-1.7 \leq X'_1 \leq 0.94$, $-0.46 \leq X'_2 \leq -0.26$, and $-1.98 \leq X'_3 \leq 5.22$, where $X'_1$, $X'_2$, and $X'_3$ represent the bending of the first, second and third consecutive lens elements of the second group.

5. A lens according to claim 2, wherein said first positive group comprises three positive lens elements, said three positive lens elements satisfying the following conditions:

$-1.7 \leq X'_1 \leq 0.94$, $-0.46 \leq X'_2 \leq -0.26$, and $-1.98 \leq X'_3 \leq 5.22$, where $X'_1$, $X'_2$, and $X'_3$ represent the bending of the first, second and third consecutive lens elements of the second group.

6. A lens according to claim 3, wherein said first positive group comprises three positive lens elements, said three positive lens elements satisfying the following conditions:

$-1.7 \leq X'_1 \leq 0.94$, $-0.46 \leq X'_2 \leq -0.26$, and $-1.98 \leq X'_3 \leq 5.22$, where $X'_1$, $X'_2$, and $X'_3$ represent the bending of the first, second and third consecutive lens elements of the second group.

7. A lens according to claim 1, wherein said second positive group comprises two lens components wherein, $-3.11 \leq X''_1 \leq -2.56$ and $2.05 \leq X''_2 \leq 2.21$, where $X''_1$ is the bending of the first lens component of said second group and $X''_2$ is the bending of the second lens component of said second lens group.

8. A lens according to claim 2, wherein said second positive group comprises two lens components wherein, $-3.11 \leq X''_1 \leq -2.56$ and $2.05 \leq X''_2 \leq 2.21$, where $X''_1$ is the bending of the first lens component of said second group and $X''_2$ is the bending of the second lens component of said second lens group.

9. A lens according to claim 3, wherein said second positive group comprises two lens components wherein, $-3.11 \leq X''_1 \leq -2.56$ and $2.05 \leq X''_2 \leq 2.21$, where $X''_1$ is the bending of the first lens component of said second group and $X''_2$ is the bending of the second lens component of said second lens group.

10. A lens according to claim 4, wherein said second positive group comprises two lens components wherein, $-3.11 \leq X''_1 \leq -2.56$ and $2.05 \leq X''_2 \leq 2.21$, where $X''_1$ is the bending of the first lens component of said second group and $X''_2$ is the bending of the second lens component of said second lens group.

11. A lens according to claim 5, wherein said second positive group comprises two lens components wherein, $-3.11 \leq X''_1 \leq -2.56$ and $2.05 \leq X''_2 \leq 2.21$, where $X''_1$ is the bending of the first lens component of said second group and $X''_2$ is the bending of the second lens component of said second lens group.

12. A lens according to claim 6, wherein said second positive group comprises two lens components wherein, $-3.11 \leq X''_1 \leq -2.56$ and $2.05 \leq X''_2 \leq 2.21$, where $X''_1$ is the bending of the first lens component of said second group and $X''_2$ is the bending of the second lens component of said second lens group.

13. A lens according to claim 11, wherein said second positive group comprises three lens components wherein, $-1.9 \leq X''_1 \leq -1.8$, $1.55 \leq X''_2 \leq 1.65$, and $5.30 \leq X''_3 \leq 5.5$, where $X''_1$ is the bending of the first lens component of said second group, $X''_2$ is the bending of the second lens component of said second lens group, and $X''_3$ is the bending of the third lens component of said second positive group.

14. A lens according to claim 2, wherein said second positive group comprises three lens components wherein, $-1.9 \leq X''_1 \leq -1.8$, $1.55 \leq X''_2 \leq 1.65$, and $5.30 \leq X''_3 \leq 5.5$, where $X''_1$ is the bending of the first lens component of said second group, $X''_2$ is the bending of the second lens component of said second lens group, and $X''_3$ is the bending of the third lens component of said second positive group.

15. A lens according to claim 3, wherein said second positive group comprises three lens components wherein, $-1.9 \leq X''_1 \leq -1.8$, $1.55 \leq X''_2 \leq 1.65$, and $5.30 \leq X''_3 \leq 5.5$, where $X''_1$ is the bending of the first lens component of said second group, $X''_2$ is the bending of the second lens component of said second lens group, and $X''_3$ is the bending of the third lens component of said second positive group.

16. A lens according to claim 4, wherein said second positive group comprises three lens components wherein, $-1.9 \leq X''_1 \leq -1.8$, $1.55 \leq X''_2 \leq 1.65$, and $5.30 \leq X''_3 \leq 5.5$, where $X''_1$ is the bending of the first lens component of said second group, $X''_2$ is the bending of the second lens component of said second lens group, and $X''_3$ is the bending of the third lens component of said second positive group.

17. A lens according to claim 5, wherein said second positive group comprises three lens components wherein, $-1.9 \leq X''_1 \leq -1.8$, $1.55 \leq X''_2 \leq 1.65$, and $5.30 \leq X''_3 \leq 5.5$, where $X''_1$ is the bending of the first lens component of said second group, $X''_2$ is the bending of the second lens component of said second lens group, and $X''_3$ is the bending of the third lens component of said second positive group.

18. A lens according to claim 6, wherein said second positive group comprises three lens components wherein, $-1.9 \leq X''_1 \leq -1.8$, $1.55 \leq X''_2 \leq 1.65$, and $5.30 \leq X''_3 \leq 5.5$, where $X''_1$ is the bending of the first lens component of said second group, $X''_2$ is the bending of the second lens component of said second lens group, and $X''_3$ is the bending of the third lens component of said second positive group.

19. A lens according to claim 1 having the following parameters:

| SURF. | CLEAR APER. (5) | AXIAL BEAM | RADIUS | THICK-NESS | INDEX $N_d$ | V-NUMBER |
|---|---|---|---|---|---|---|
|  | 9.56 | 9.56 | DIAPHRAGM | A |  |  |
| 1 | 28.80 | 9.56 | PLANO | 2.000 | 1.517 | 64.2 |
| 2 | 29.29 | 9.56 | PLANO | 7.229 |  |  |
| 3 | 30.07 | 9.56 | −24.5755 | 2.810 | 1.501 | 56.4 |
| 4 | 36.02 | 9.99 | 1212.26 | 6.334 | 1.847 | 23.8 |
| 5 | 39.94 | 10.66 | 372.272 | 7.222 |  |  |
| 6 | 47.26 | 12.21 | −205.807 | 13.500 | 1.847 | 23.8 |
| 7 | 53.40 | 14.13 | −54.4437 | 1.000 |  |  |
| 8 | 58.41 | 14.21 | 255.486 | 14.321 | 1.847 | 23.8 |
| 9 | 59.72 | 14.23 | −96.7395 | 1.000 |  |  |
| 10 | 56.43 | 14.02 | 55.2834 | 13.792 | 1.847 | 23.8 |
| 11 | 50.07 | 11.55 | 86.0143 | 1.000 |  |  |
| 12 | 45.97 | 11.27 | 34.7582 | 9.740 | 1.847 | 23.8 |
| 13 | 40.10 | 8.70 | 50.4295 | 3.000 |  |  |
| 14 | 36.92 | 7.65 | 50.7879 | 15.000 | 1.847 | 23.8 |
| 15 | 20.27 | 3.74 | 15.0430 | 5.757 |  |  |
| 16 | 17.99 | 2.22 | 17.8527 | 3.768 | 1.847 | 23.8 |
| 17 | 16.55 | 1.46 | 76.2142 |  |  |  |

20. A lens according to claim 1 having the following parameters:

| SURF. | CLEAR APER. (3) | AXIAL BEAM | RADIUS | THICK-NESS | INDEX | V-NUMBER |
|---|---|---|---|---|---|---|
| | 9.56 | 9.56 | DIAPHRAGM | A | | |
| 1 | 29.45 | 9.56 | −31.0214 | 4.183 | 1.517 | 64.2 |
| 2 | 33.35 | 10.03 | −104.555 | 4.983 | | |
| 3 | 35.64 | 10.56 | −50.6343 | 8.949 | 1.805 | 25.4 |
| 4 | 40.70 | 11.92 | −40.9417 | 0.150 | | |
| 5 | 43.44 | 11.95 | 534.535 | 7.250 | 1.805 | 25.4 |
| 6 | 44.45 | 12.05 | −121.489 | 0.200 | | |
| 7 | 44.87 | 12.02 | 99.5818 | 7.250 | 1.805 | 25.4 |
| 8 | 43.99 | 11.43 | 267.602 | 0.177 | | |
| 9 | 43.16 | 11.37 | 40.0994 | 21.100 | 1.805 | 25.4 |
| 10 | 30.91 | 7.36 | 26.8715 | 14.055 | | |
| 11 | 30.28 | 5.64 | 59.0334 | 11.526 | 1.805 | 25.4 |
| 12 | 27.60 | 4.36 | 151.299 | | | |

21. A scanner configured to provide a two-dimensional scan of a radiation beam moving along a path, comprising:

(1) a first deflector for deflecting the beam through a first scan direction at a first angular velocity;

(2) a second deflector for deflecting the beam through a second scan direction at a second angular velocity, said second scan direction being substantially orthogonal to said first scan direction; and (3) a lens, said lens comprising three groups of lens elements in order:
a negative group with a front-most lens element concave to the front,
a first positive group of lens elements having at least two positive power lens elements and no negative lens elements, the front most lens element of said first positive group having its strongest surface facing the rear, and
a second positive group of lens elements, said second positive group having stronger optical power than said first positive group, said second positive group including at least one positive meniscus lens component which is concave to the rear, wherein $$-1.65 \leq \frac{efl_1}{efl} \leq -0.86,$$

$$0.60 \leq \frac{efl_2}{efl} \leq 1.36, \text{ and}$$

$$2.47 \leq \frac{efl_3}{efl} \leq 4.65,$$

where efl is the focal length of said lens, $efl_1$ is the focal length of said first negative lens group, $efl_2$ is the focal length of said first positive lens group and $efl_3$ is the focal length of said second positive lens group, said lens being located downstream in the path of the beam from said deflectors for focusing the beam to a spots said scan lens having appropriate distortion characteristics to ensure that a linear velocity of the spot is proportional to said first and second angular velocities.

22. A scanner according to claim 21, wherein one of said deflectors comprises a holographic grating.

* * * * *

UNITED STATES PATENT AND TRADEMARK OFFICE
CERTIFICATE OF CORRECTION

PATENT NO. : 5,633,736
DATED : May, 27, 1997
INVENTOR(S) : John D. Griffith, et al It is certified that error appears in the above-identified patent and that said Letters Patent is hereby corrected as shown below:

Column 46, Line 58, Claim 13    delete "11" insert --1--
Column 50, Line 35, Claim 21    delete "spots" insert --spot,--

Signed and Sealed this

Ninth Day of December, 1997

Attest:

BRUCE LEHMAN

*Attesting Officer*      *Commissioner of Patents and Trademarks*